(12) United States Patent
Descarpentries

(10) Patent No.: US 11,358,867 B2
(45) Date of Patent: Jun. 14, 2022

(54) FACILITY FOR PRODUCING A COMPOSITE MATERIAL COMPRISING CARBON NANOTUBES, AND METHOD FOR IMPLEMENTING SAID FACILITY

(71) Applicant: NAWATECHNOLOGIES, Aix-en-Provence (FR)

(72) Inventor: Jérémie Descarpentries, Gif sur Yvette (FR)

(73) Assignee: NAWATECHNOLOGIES, Aix-en-Provence (FR)

( * ) Notice: Subject to any disclaimer, the term of this patent is extended or adjusted under 35 U.S.C. 154(b) by 113 days.

(21) Appl. No.: 16/330,650

(22) PCT Filed: Apr. 25, 2017

(86) PCT No.: PCT/FR2017/050976
§ 371 (c)(1),
(2) Date: Mar. 5, 2019

(87) PCT Pub. No.: WO2017/187080
PCT Pub. Date: Nov. 2, 2017

(65) Prior Publication Data
US 2021/0371285 A1  Dec. 2, 2021

(30) Foreign Application Priority Data

Apr. 25, 2016 (FR) ...................................... 1653606

(51) Int. Cl.
*C01B 32/164* (2017.01)
*B01J 19/18* (2006.01)
(Continued)

(52) U.S. Cl.
CPC ............. *C01B 32/164* (2017.08); *B01J 8/004* (2013.01); *B01J 19/14* (2013.01); *B01J 19/1875* (2013.01);
(Continued)

(58) Field of Classification Search
CPC .............. C01B 32/164; C01B 2202/08; C01B 2202/34; C01B 2202/36; B01J 8/004;
(Continued)

(56) References Cited

U.S. PATENT DOCUMENTS 7,160,531 B1    1/2007 Jacques et al.
7,504,078 B1 *  3/2009 Jacques .................. B82Y 30/00
                                                                422/150
(Continued)

FOREIGN PATENT DOCUMENTS

EP          2397441 A1    12/2011
WO     2013059506 A1     4/2013

OTHER PUBLICATIONS

Yasuda et al., "Improved and large area single-walled carbon nanotube forest growth by controlling the gas flow direction", ACS NANO, American Chemical Society USA, vol. 3, No. 12, Dec. 22, 2009, pp. 4164-4170, Abstract only.

*Primary Examiner* — Lessanework Seifu
(74) *Attorney, Agent, or Firm* — Jordan IP Law, LLC; Todd A. Vaughn

(57) ABSTRACT

A facility for producing a composite material that includes carbon nanotubes. The facility includes a reaction chamber with an injection device for injecting an active gas mixture (for the growth of the carbon nanotubes) into the interior volume thereof. A transport device is to transport a substrate into the reaction chamber to form the composite material. The injection device may transport the active gas mixture in a first direction into the interior volume. A circulation device is to circulate the active gas mixture, and may transport the active gas mixture into the interior volume in a second direction that is different from the first direction. The circulation device may adopt a first configuration of injection of the active gas mixture into the interior volume of the
(Continued)

chamber, and a second configuration of extraction of the active gas mixture from the interior volume.

20 Claims, 19 Drawing Sheets

(51) Int. Cl.
 *B01J 8/00* (2006.01)
 *B01J 19/14* (2006.01)
(52) U.S. Cl.
 CPC .............. *B01J 2219/00085* (2013.01); *B01J 2219/00162* (2013.01); *B01J 2219/00164* (2013.01); *C01B 2202/08* (2013.01); *C01B 2202/36* (2013.01)
(58) Field of Classification Search
 CPC ........ B01J 19/22; B01J 19/14; B01J 19/1868; B01J 19/1875; B01J 19/1881; B01J 4/001; B01J 4/004; B01J 4/005; B01J 6/008; B01J 2219/00085; B01J 2219/00162; B01J 2219/00164
 See application file for complete search history.

(56) References Cited

U.S. PATENT DOCUMENTS

| | | |
|---|---|---|
| 9,227,171 B2 * | 1/2016 | Shibuya ................ B01J 19/22 |
| 2011/0318256 A1 | 12/2011 | Nakayama et al. |
| 2013/0189432 A1 | 7/2013 | Nakashima |

* cited by examiner

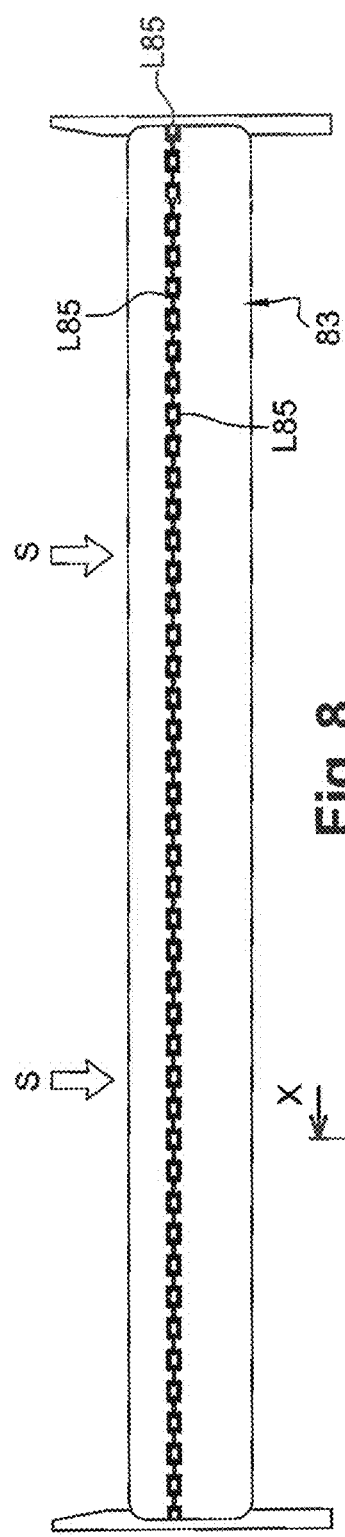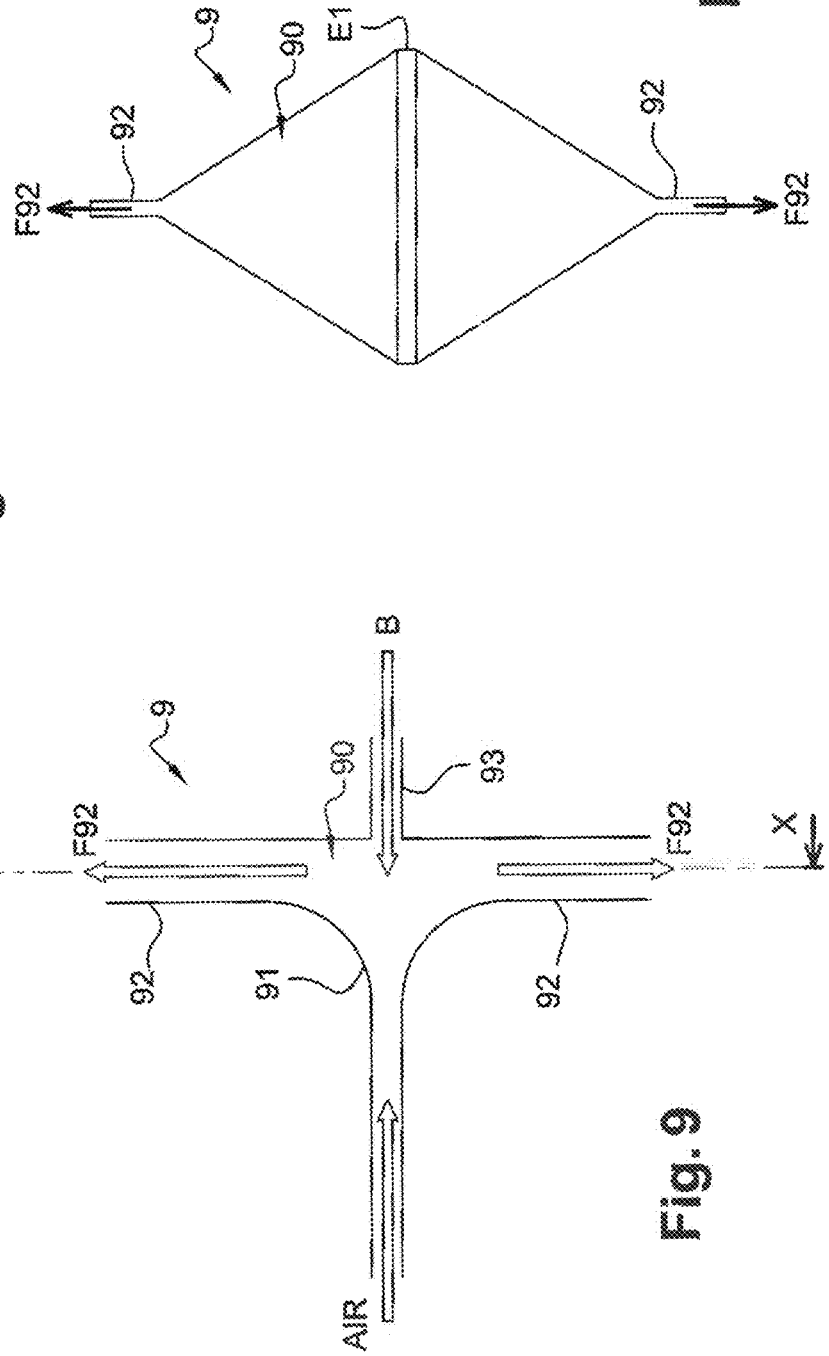

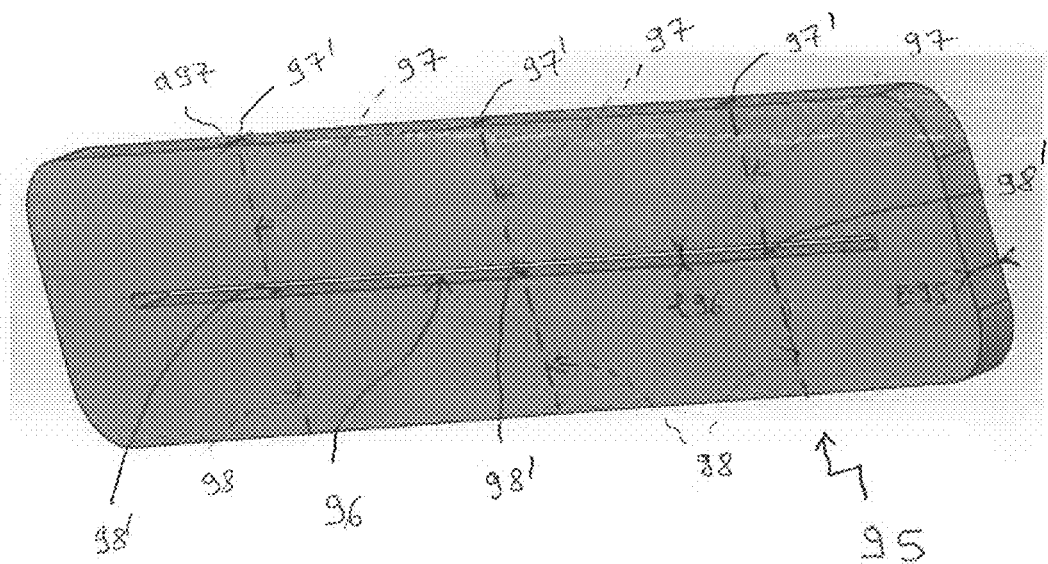
FIGURE 18
FIGURE 19
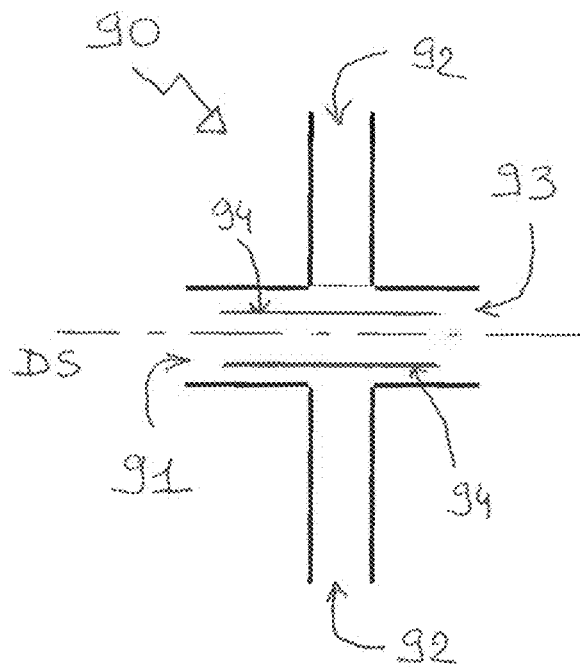
FIGURE 20
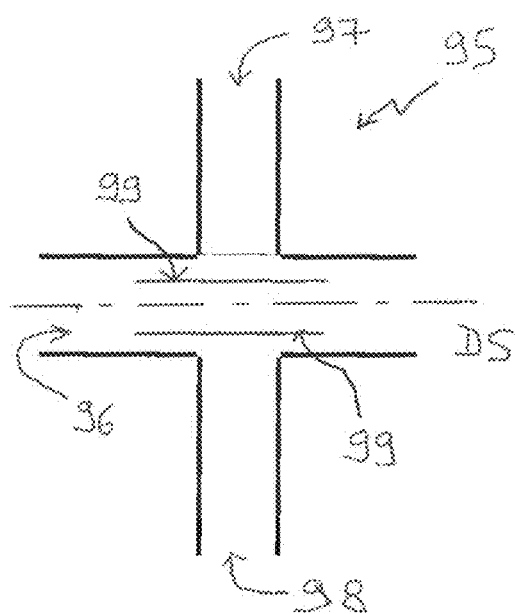

FIGURE 21
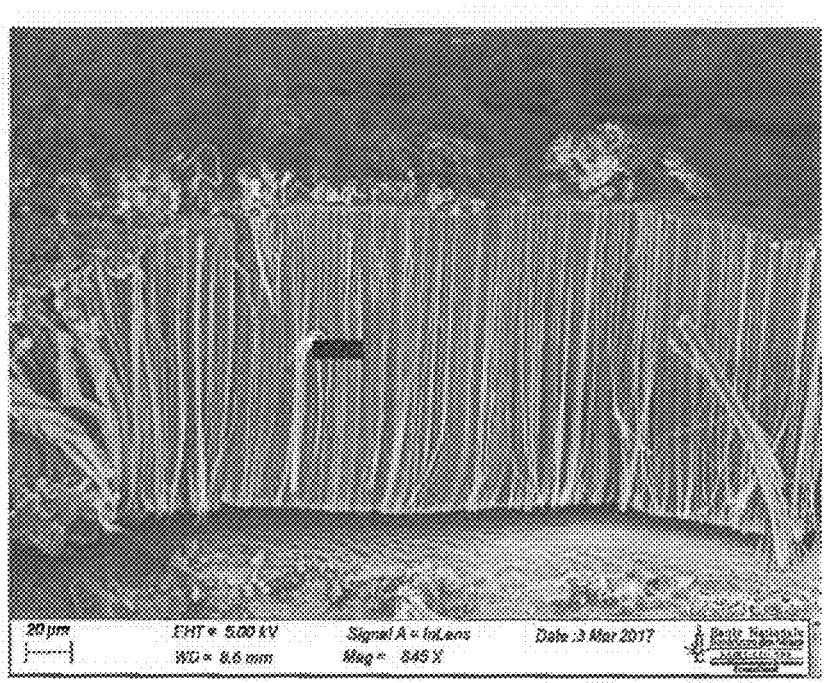
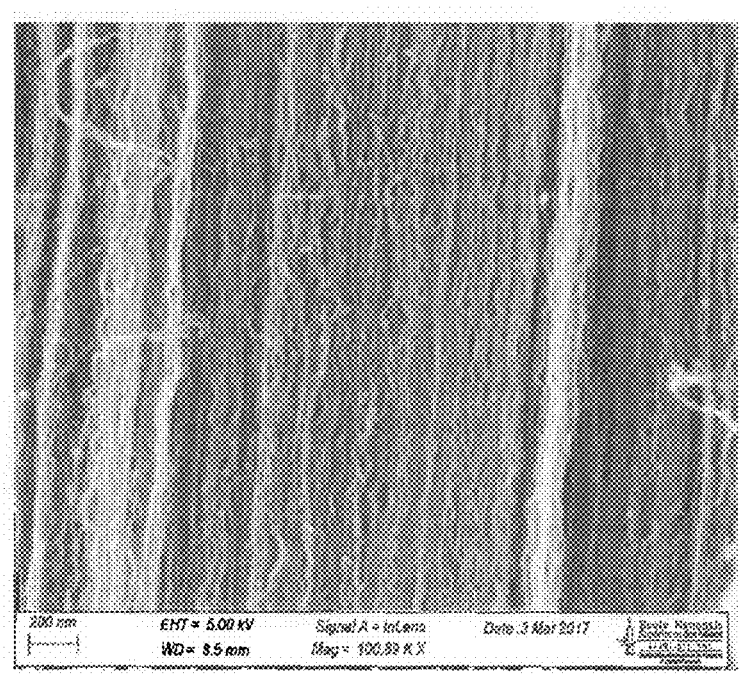
FIGURE 22 though FR 3 013 061 A1 provides substantial details on
FACILITY FOR PRODUCING A COMPOSITE MATERIAL COMPRISING CARBON NANOTUBES, AND METHOD FOR IMPLEMENTING SAID FACILITY

CROSS-REFERENCE TO RELATED APPLICATIONS

The present application is a National Stage Application of PCT International Application No. PCT/FR2017/050976 (filed on Apr. 25, 2017), under 35 U.S.C. § 371, which claims priority to French Patent Application No. 1653606 (filed on Apr. 25, 2016), which are each hereby incorporated by reference in their respective entireties.

TECHNICAL FIELD

The invention relates to the field of reactors for depositing carbon nanotubes from a vapor phase onto a solid substrate. More specifically, it relates to a facility for producing a composite material comprising carbon nanotubes, in particular vertically aligned carbon nanotubes (VACNT), deposited onto a substrate that is typically moving. The invention also relates to a method for implementing said facility.

BACKGROUND

Carbon nanotubes (often abbreviated "CNT") have walls formed by graphite single-sheets (graphene sheets). Whether they are single-sheet walls or multi-sheet walls, they have particular mechanical, thermal, electronic and structural properties; these properties reflect their strong structural anisotropy. Numerous applications have been envisaged that take advantage of these particular properties. Thus, polymer materials filled with nanotubes have been prepared, which have been used to produce tennis racquets, taking advantage of mechanical properties combining strength and flexibility. It has also been envisaged to take advantage of their high electronic conductivity in the direction of the length of the tubes.

For a decade, it has been known to deposit CNTs vertically aligned on a substrate; this product is known as VACNT (vertically aligned carbon nanotubes). Hu et al. ("3-omega measurements of vertically oriented carbon nanotubes on silicon", J. Heat Transf. 128 (2006) pages 1109-1113) describe the possibility of using a VACNT mat as a thermal interface material (TIM). Thermal interface materials are used to remove the heat produced by electronic components with which they are in thermal contact. The authors observe that, on a VACNT mat deposited on a silicon crystal, the thermal conductivity in the direction of the width (i.e. parallel to the length of the aligned tubes) is much higher than that of the thermal interface tubes that are available on the market.

The document FR 3 013 061 A1 describes a method for continuous production of nanostructures aligned on a moving support, including the conveyance of the support through a heated space and the synthesis, in said space, of nanostructures aligned on the support by catalytic chemical vapor deposition. According to this method, the heated space is divided into at least two consecutive zones in the direction of conveyance of the support. The synthesis of the nanostructures results from operations of heating and operations of injection, in each of the aforementioned zones, of a stream of an aerosol containing a catalytic precursor and a source precursor of the material of the nanostructures to be formed, transported by a carrier gas.

The injection operations are performed by modifying, in at least two of said zones, a parameter chosen from the flow rate of the stream of carrier gas and the chemical composition of the carrier gas. In doing so, conditions are obtained for the synthesis of different nanostructures in at least two of said zones. The carrier gas may be an inert gas or a reactive gas or an inert gas/reactive gas mixture; as for the aerosol, it corresponds to the dispersion, in the form of droplets, of the liquid or the solution containing the catalytic precursor and/or the source precursor in the carrier gas, said dispersion being obtained by spraying or by nebulization of the liquid or the solution in the carrier gas.

This known solution has certain limits, however. Indeed, even though FR 3 013 061 A1 provides substantial details on the method of production, it simply describes the corresponding facility in a schematic manner. On reading said document, it therefore is not possible to glean any meaningful teaching regarding the design. In particular, said document does not contain any teaching concerning the means for confining the atmosphere inside the reactor and the gas injection means—a teaching that would be useful in order to be capable of producing an industrial-scale reactor.

The document US 2011/3182560 also teaches a facility for continuous synthesis of carbon nanotubes, which includes a coating and drying zone, a synthesis zone, as well as a collection zone. In the synthesis zone, the gas mixture is injected by tubes, in a direction perpendicular to the direction of movement of the substrate. Gas extraction ducts are also provided on either side of the synthesis zone, so as to remove the gas also in a direction perpendicular to the direction of movement of the substrate. This known facility has certain disadvantages, however, in particular associated with its lack of modularity.

Furthermore, the documents EP 2 397 441 and US 2013/189432 describe different embodiments of apparatuses intended for the production of carbon nanotubes. These apparatuses include, in particular, gas injection sections, which use shower head or perforated plate-type injection members.

SUMMARY

In consideration of the above, one objective of the present invention is therefore to at least partially overcome the disadvantages of the prior art mentioned above.

Another objective of the invention is to propose a facility making it possible to implement, both simply and effectively, a method for producing a composite material comprising carbon nanotubes.

Another objective of the invention is to propose such a facility that can be implemented in a flexible manner, so that the parameters of the method can be varied conveniently.

Another objective of the invention is to propose such a facility, which has a modulable structure, while retaining satisfactory simplicity.

According to the invention, the objectives mentioned above are achieved by means of a facility for producing a composite material comprising carbon nanotubes, said facility including: (i) at least one treatment chamber, or reaction chamber, including means for injecting an active gas mixture into the interior volume of said chamber, said gas mixture being intended for the growth of carbon nanotubes; (ii) means for transporting a substrate intended to form said composite material, in the form of a sheet or strip, into the chamber; and (iii) means for circulating the gas mixture that is capable of adopting a first configuration of injection of the active gas mixture into the interior volume of said chamber, as well as a second configuration of extraction of the active gas mixture from said interior volume, wherein: (i) the injection means are capable of transporting the active mixture in a first direction into said interior volume, and (ii) the means for circulating the gas mixture is capable of transporting the active mixture into said interior volume in a second direction that is different from said first direction.

According to other features of the facility of the invention, considered alone or in any technically compatible combination: (i) said first direction is substantially perpendicular to the direction of movement of the substrate into the chamber, while said second direction is substantially parallel to the direction of movement of the substrate; (ii) the circulation means include at least two circulation devices, respectively upstream and downstream, provided on either side of the injection means, in reference to the direction of movement of the substrate; (iii) each circulation device is equipped with connection means suitable for being selectively connected, either to a gas mixture source, or to a vacuum source; (iv) the two circulation devices have identical structures and are arranged symmetrically with respect to a transverse plane of the chamber; (v) each circulation device includes a body defining an interior volume as well as orifices having an outlet, outside of said interior volume, which extends in said second direction; (vi) the injection means include at least one injection module, each injection module including a perforated plate for distribution of a gas mixture, as well as a cover defining a homogenization volume for said mixture; (vii) each injection module includes a distribution member in the form of an inverted umbrella, suitable for distributing the gas in the interior volume of said module; (viii) the injection means include at least two injection modules arranged one behind the other, in reference to the direction of movement of the substrate; (ix) the injection modules include attachment means that can be removed one with respect to another; (x) said facility also includes at least two units for supplying a barrier gas, provided on either side of the injection means, in reference to the direction of movement of the substrate; (xi) each barrier gas supply unit includes at least one line of supply slots, said line being tilted toward the outside of the chamber, in a side view; (xii) the injection means, the circulation means and, optionally, the barrier gas supply units are housed in an enclosure, said enclosure also including heating means; (xiii) said enclosure includes a fixed support for receiving the substrate, said support defining a lower zone for receiving heating means, as well as an upper zone in which the treatment chamber is placed; (xiv) said enclosure is produced in the form of a box provided with a hatch making it possible to access the interior of said box, the injection means, the circulation means and, optionally, the barrier gas supply units being attached, in particular removably, to said hatch of said box; (xv) said facility also includes at least two gas suction assemblies, provided on either side of the injection means, in reference to the direction of movement of the substrate; (xvi) said gas suction assembly includes two extraction ducts, in which the gas flows transversely with respect to the direction of movement of the substrate, and said suction assembly is equipped with two deflectors, extending substantially parallel to the direction of movement of the substrate, each deflector being placed opposite at least a portion of the outlet of a respective extraction duct; (xvii) said facility also includes a complementary gas injection member, inserted between the upstream gas suction assembly and the inlet of the reaction chamber; and (xviii) said complementary gas injection member includes two series of injection orifices, in which the gas flows transversely with respect to the direction of movement of the substrate, and said complementary injection member is equipped with two deflectors, extending substantially parallel to the direction of movement of the substrate, each deflector being placed opposite at least a portion of the outlet of a respective series of injection orifices.

The objectives mentioned above are also achieved by means of a method for implementing the facility as above, in which: (i) the injection means are activated so as to admit the active gas mixture into the interior volume of the chamber, in the first direction; (ii) the circulation means are activated so as to transport said active gas mixture along said chamber, in the second direction; and (iii) the substrate is moved into said chamber, so as to form carbon nanotubes at the surface of said substrate.

According to other features of the method according to the invention, considered alone or in any technically compatible combination: (i) the active gas mixture is transported in a direction parallel to the direction of movement of the substrate; (ii) a first fraction of the active gas mixture is admitted by the injection means and a second fraction of the active gas mixture is admitted by the circulation means; (iii) the second fraction of the active gas mixture is admitted upstream of the reaction chamber, so that the active gas mixture is transported in the same direction as the direction of movement of the substrate; (iv) the second fraction of the active gas mixture is admitted downstream of the reaction chamber, so that the active gas mixture is transported in the same direction as the direction opposite the direction of movement of the substrate; (v) the entire active gas mixture is admitted by the injection means, and the two circulation devices, respectively upstream and downstream, are activated so that a portion of the active gas mixture is transported in the same direction as the direction of movement of the substrate, while another portion of the gas mixture is transported in the direction opposite the direction of movement of the substrate; (vi) said active gas mixture includes an organometallic catalyst and a carbon source gas; and (vii) the pressure in said treatment chamber is between 0.6 bar and 1.4 bar, preferably between 0.8 bar and 1.2 bar and even more preferably between 0.9 bar and 1.1 bar; (viii) the reaction chamber is placed under reduced pressure with respect to the rest of the enclosure, the difference between the pressure of the rest of the enclosure and the pressure of the reaction chamber being between 1 and 20 Pa, in particular between 2 and 10 Pa, and in particular around 5 Pa.

DRAWINGS

The invention will be described below in reference to the appended drawings, provided solely as non-limiting examples, wherein:

FIG. 8 is a bottom view showing the barrier gas distribution unit of FIG. 7.

FIG. 9 is a longitudinal cross-section view showing a suction unit belonging to the facility according to the invention.

FIG. 10 is a cross-section view, along line X-X of FIG. 9, showing the suction unit of FIG. 9.

FIG. 18 is a perspective view, showing, on a larger scale, the complementary member shown in FIG. 17.

FIG. 19 is a longitudinal cross-section view corresponding to FIG. 9, showing an alternative embodiment of the suction unit shown in said FIG. 9.

FIG. 20 is a longitudinal cross-section view, showing an alternative embodiment of the complementary member shown in FIGS. 17 and 18.

FIGS. 21 and 22 are photographs showing, at two different magnifications, a sample obtained by a first synthesis according to the invention, resulting from the growth of vertically aligned carbon nanotubes on an aluminum alloy.

DESCRIPTION

Figure 1:
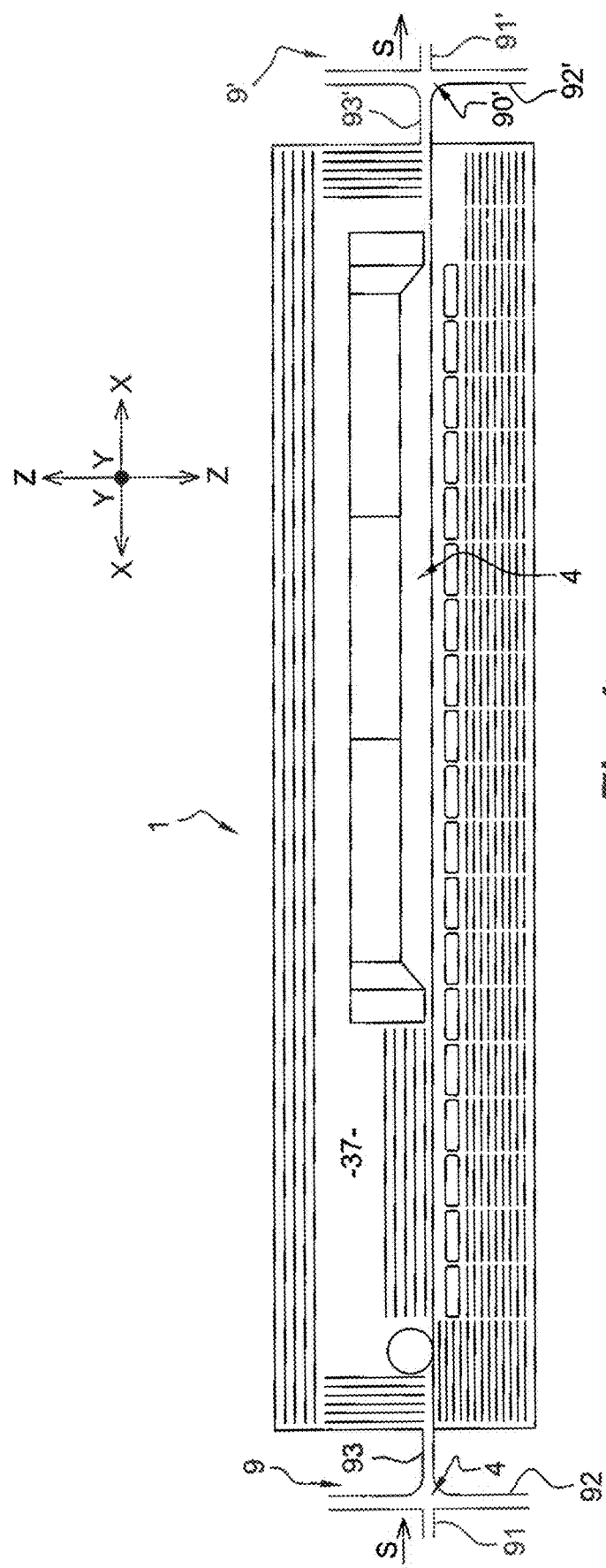
FIG. 1 is a front view showing a facility according to an embodiment of the invention.

The appended figures show an embodiment of a facility according to the invention. In FIG. 1, it is centered on three axes, namely a longitudinal axis XX of the facility, a so-called lateral or transverse axis YY, and a vertical axis ZZ.

This facility essentially includes a main enclosure, designated as a whole by reference 1, an upstream suction assembly 9 and a downstream suction assembly 9'. The main enclosure 1, with a parallelepiped shape, typically has the following dimensions: length L1 between 150 centimeters (cm) and 450 cm, width I1 between 15 cm and 100 cm, and height H1 between 20 cm and 150 cm. These values are provided as an indication for a substrate having a width of approximately 100 cm. A person skilled in the art can adapt these dimensions in particular according to the width of said substrate.

The enclosure 1 has two main zones, a lower zone 2 and an upper zone 3, respectively (see in particular FIG. 2), which are separated by a horizontal soleplate 10, which will be described in greater detail below. In the present embodiment, these zones 2 and 3 are physically separated by a fixed mechanical member, namely the aforementioned soleplate. It is noted, however, that, in other embodiments of the invention that are not shown, such a fixed member is not provided, so that said two zones are defined by the substrate itself.

The lower zone 2 extends over a height H2, which is typically between 10% and 50% of the total height H1 defined above. It is bordered by different walls, namely opposing front 21 and rear 22 walls, opposing side walls, as well as a bottom wall 25. The soleplate 10 is typically formed by a metal sheet having a thickness, for example, of between 3 mm and 20 mm, the material of which is adapted to the temperature of the method. It may be placed on a frame to promote its thermal expansion. It is also possible to use a graphite plate. The soleplate is immobile with respect to the walls of the enclosure.

The aforementioned walls of the lower zone 2 define, with the soleplate 10, a receiving volume for heating modules 26, of a type known per se. These modules 26 are arranged one behind another, along the axis X-X. Advantageously, each module may be replaced independently of the others, thereby ensuring convenient maintenance.

Figure 3:
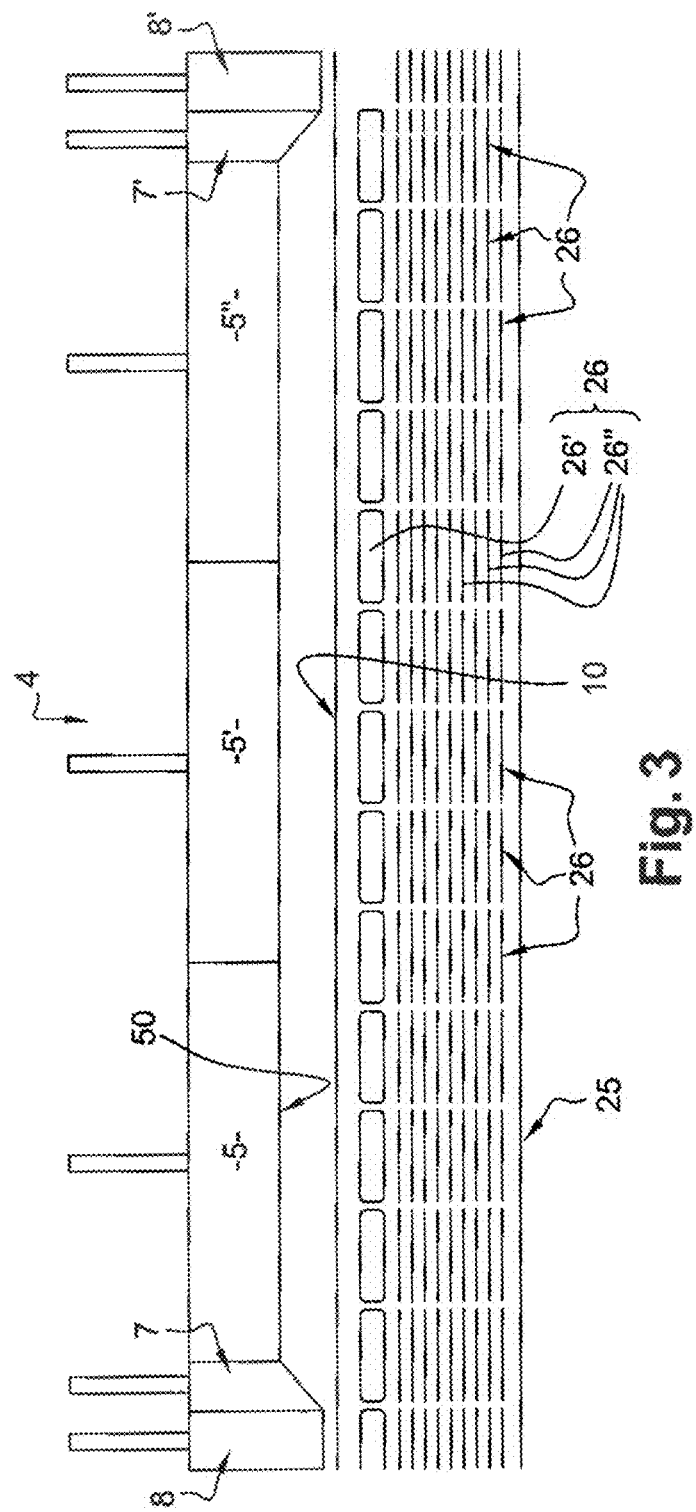
FIG. 3 is a front view showing, on an even larger scale, a reaction chamber belonging to the enclosure of FIG. 2.
Figure 4:
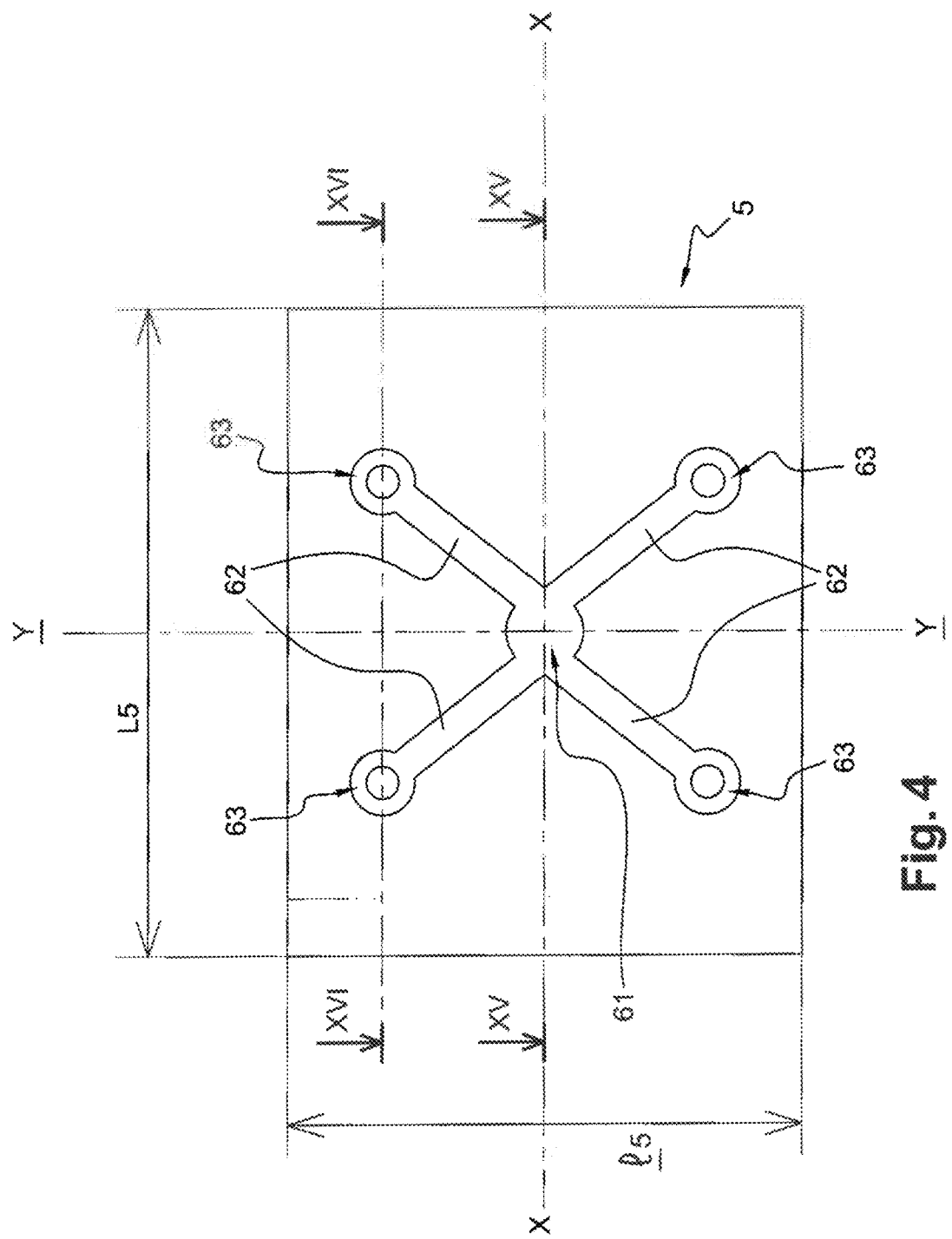
FIG. 4 is a top view showing a reactive gas injection module belonging to the reaction chamber of FIG. 3.

As is shown more specifically in FIG. 3, each module 26 includes an upper heating element 26', arranged immediately under the soleplate 10, as well as a lower stack of insulating plates 26". In a first embodiment, these heating elements 26' are ceramic elements. Alternatively, they may allow for heating by radiation; they may be, for example, infrared emitters.

The upper zone 3 is bordered by different walls, namely opposing front 31 and rear 32 walls, opposing side walls, as well as a top wall 35. On their interior face, these walls are covered by means of plate stacks 36, having a thermal insulation function. The opposing front walls 21 and 31 define an inlet E1 of the enclosure, while the opposing rear walls 22 and 32 define an outlet of said enclosure. Said inlet and said outlet, which have a height, for example, of between 0.2 cm and 1.0 cm, extend over a width, for example, of between 10 and 150 cm.

Figure 2:
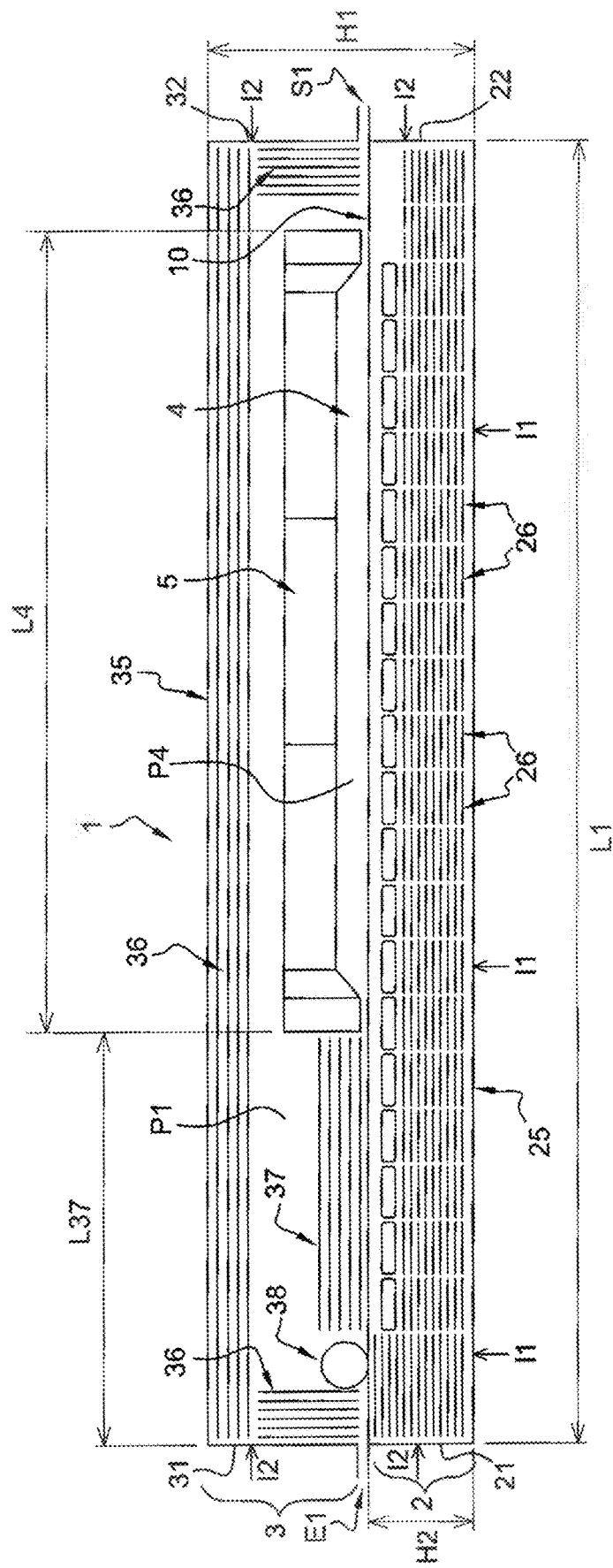
FIG. 2 is a front view showing, on a larger scale, a main enclosure belonging to the facility according to the invention.

The upper zone of the enclosure 1 successively defines an upstream preheating region 37, as well as a reaction chamber 4, also called the treatment chamber, which will be described in greater detail below. As an example, the length L37 of said preheating region 37 is between 20 and 100 cm, while the length L4 of said reaction chamber 4 is between 70 and 230 cm. It is therefore noted that FIGS. 1 and 2 are not drawn to scale, in order to more clearly illustrate the reaction chamber 4. The preheating region 37 is equipped in particular with a tensioning roller 38, of a type known per se.

Downstream of said preheating region 37, the upper zone 3 defines a reaction chamber, designated as a whole by reference 4. Said chamber essentially includes (see FIG. 3): reactive gas injection modules 5, 5' and 5", arranged one after another in the direction of movement of the substrate; two devices 7 and 7', each of which can advantageously be used either in injection mode or in extraction mode, as will become clearer in the description below. Consequently, these devices, which are respectively provided immediately upstream and immediately downstream of the aforementioned modules 5 to 5", are referred to as reactive gas circulation devices; and two barrier gas distribution units 8 and 8', provided on either side of devices 7 and 7'.

The facility according to the invention, for producing a composite material comprising carbon nanotubes, is designed to operate at a pressure in the reaction chamber 4 that is typically close to atmospheric pressure. More specifically, it is advantageously between 0.6 bar and 1.4 bar, more advantageously between 0.7 bar and 1.3 bar, more preferably between 0.8 bar and 1.2 bar, even more preferably between 0.9 bar and 1.1 bar, and optimally between 0.95 bar and 1 bar.

A range of between 0.9 bar and 1.1 bar, in particular between 0.95 bar and 1 bar, makes it possible, inter alia, to avoid exerting excessive mechanical stresses on the various components of the facility. The latter may therefore have a reasonable weight.

According to an advantageous alternative, the reaction chamber 4 is placed under a slightly reduced pressure, with respect to the rest of the enclosure 1. This makes it possible to ensure a satisfactory confinement of the reactive gases inside said chamber 4. As an example, the difference between the pressure P1 of the rest of the enclosure 1 and the pressure P4 of the chamber 4 (see FIG. 2) is between 1 and 20 Pa, in particular between 2 and 10 Pa, typically around 5 Pa. Advantageously, the value of P1 may be slightly below atmospheric pressure, for example between 10 and 100 Pa, in particular between 30 and 70 Pa, and typically 50 Pa below said atmospheric pressure value.

In reference to FIGS. 4, 5, 15 and 16, the structure of one 5 of the three injection modules will first be described, with the understanding that it is identical for each of said three modules. In the example shown, three modules were provided but, as an alternative, the chamber may be equipped with a different number of such modules, for example between two and five. It is advantageous to provide basic modules, the number of which can be varied according to each facility. Indeed, this also makes it possible to modify the gas flow rates, as well as the different gas concentrations in each of said modules.

Figure 15:
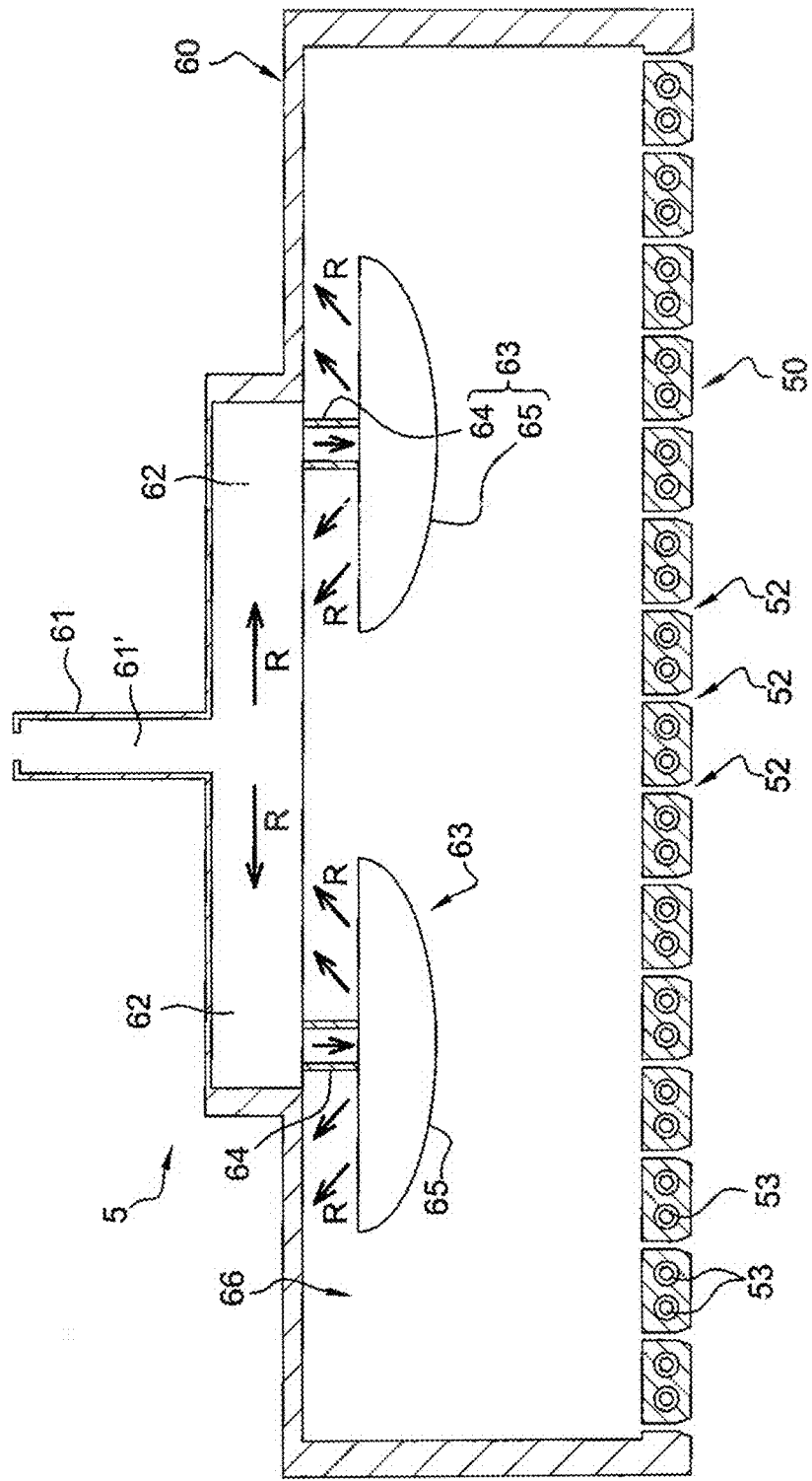
FIGS. 15 and 16 are longitudinal cross-section views, along cross-section lines XV-XV and XVI-XVI in FIG. 4, showing the injection module represented in FIG. 3.
Figure 16:
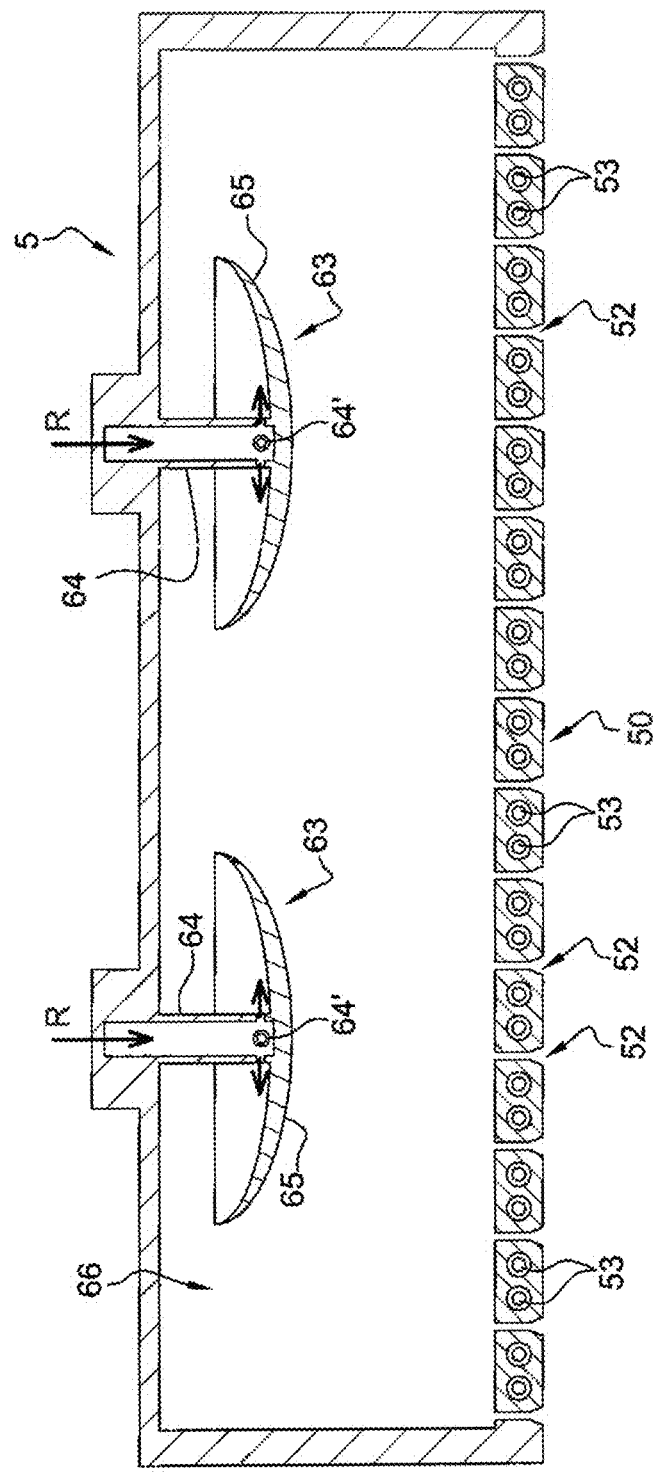

FIGS. 15 and 16 show the module 5 along two different cross-section lines, at a distance from one another along the lateral axis Y-Y. FIG. 15 is a median cross-section view, namely along line XV-XV, which corresponds to the median longitudinal axis X-X, while FIG. 16 is a cross-section view along line XVI-XVI, which extends between the middle of the enclosure and one of the lateral edges of said enclosure.

As shown in said FIGS. 15 and 16, the module 5 includes a base plate 50 (also visible in FIG. 3), which has a thickness, for example, of between 0.5 and 2.0 cm. The length L5 of said module, namely its dimension along the axis X-X, is, for example, between 20 cm and 60 cm. The width 15 of said module, namely its dimension along the axis Y-Y, is, for example, between 20 cm and 55 cm.

At its two longitudinal ends, said plate 50 is equipped with means allowing its removable attachment, either to an identical plate belonging to the adjacent module or to one or the other of devices 7 or 7'. In the example described, it is possible, for example, to find, respectively, tenons and mortises, which are not shown, allowing for a snap-fitting attachment with a complementary element, also not shown.

Said plate 50 is first drilled with orifices 52 intended for gas injection toward the substrate, which extend between the opposite faces of said plate. In the example shown, said orifices are substantially vertical. Nevertheless, as an alternative, it is possible for them to extend obliquely, forming an angle for example between 0° and 60° with respect to the vertical. In this case, the outlet of said orifices advantageously faces downstream, in reference to the direction of movement of the substrate.

Figure 5:
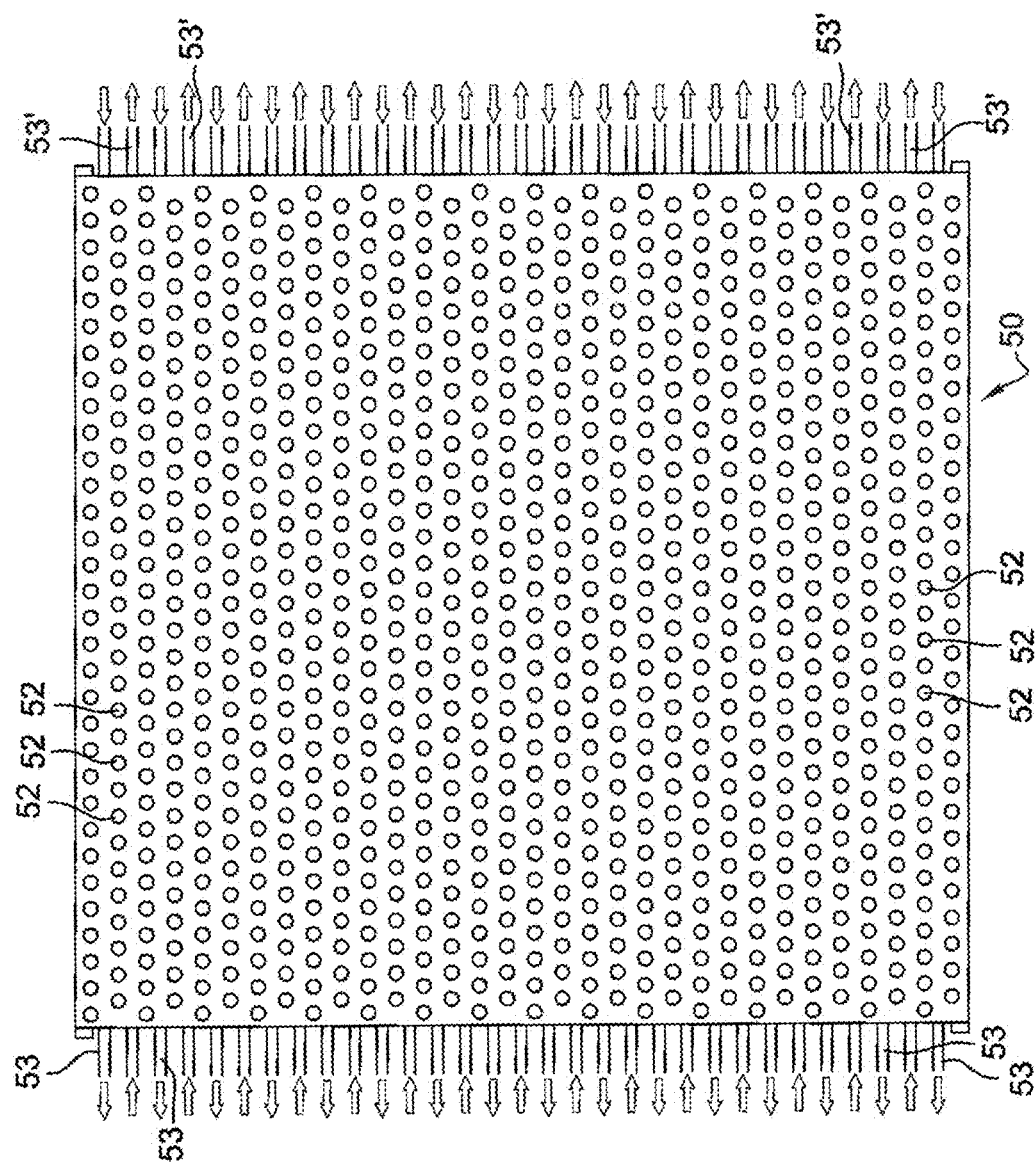
FIG. 5 is a top view, showing an injection plate belonging to the module of FIG. 4.

The number of said orifices, which are distributed regularly over the entire surface of the plate as shown, more specifically, in FIG. 5 is, for example, between 100 and 2000, typically around 1000. Advantageously, at the end of each hole, a fillet, not shown, is provided, which is intended to facilitate the distribution of the gas.

Said plate 50 is also drilled, in its thickness, with transverse orifices 53, which link the lateral faces of said plate. Each orifice is in communication with an intake or a discharge of a heat transfer fluid, typically water. Said communication is achieved owing to end-pieces, schematically represented. Preferably, there is an alternation between the end-pieces 53' intended for the fluid inlet and the end-pieces 53" intended for the outlet of said fluid (see FIG. 5), in order to obtain a homogenous cooling over the entire surface of the plate 50.

Again, in reference to FIGS. 15 and 16, the module 5 includes, aside from the aforementioned plate 50, a hollow body 60 forming a cover, which is attached to the upper face of the plate by any suitable means. Removable attachment means are preferred, for example, of the tenon and mortise type. It is possible in particular to provide tenons, not shown, projecting from the upper face of the plate and penetrating mortises formed in the opposing faces of the cover 60.

Said cover 60 is equipped, on its upper portion, with a neck 61 (FIGS. 4 and 15) defining a gas intake channel 61'. Said neck is in communication, by any suitable means, with a reactive gas supply source, not shown. Said channel 61' laterally opens into horizontal passages 62, provided in the upper portion of the cover, which communicate with diffusion members 63. As shown in particular in FIG. 4, said passages 62 extend in a star pattern from the neck 61. The number of diffusion members 63, for each module 5, is, for example, between one and ten. The example shown has four diffusion members, the arrangement of which can be seen in FIG. 4.

Each diffusion member 63 first includes a vertical tube 64, in which, perpendicularly to the surface of said tube, orifices 64' are provided, the dimensions of which are typically from 0.2 mm to 1 mm. Each member 63 also includes a diffusion element 65, in the form of an inverted umbrella, the concavity of which faces the top of the cover. It is noted that the different diffusion elements 65 are not placed along the median longitudinal axis X-X. Thus, they are cut down the middle in FIG. 16, but not in FIG. 15.

Said different diffusion members 63 are placed in a main enclosure 66, for gas homogenization. The path of the reactive gases is represented by the different arrows R. The lower portion of said enclosure communicates with the inlet of the different injection orifices 52. According to an alternative not shown, it is possible to insert a thermocouple into the plate 50 so as to control the temperature of the latter. According to another alternative not shown, it is advantageously possible for each module 5, 5', 5" to be mobile along the axis Z-Z with respect to the soleplate 10, so as to vary the height of the reaction chamber 4.

Figure 6:
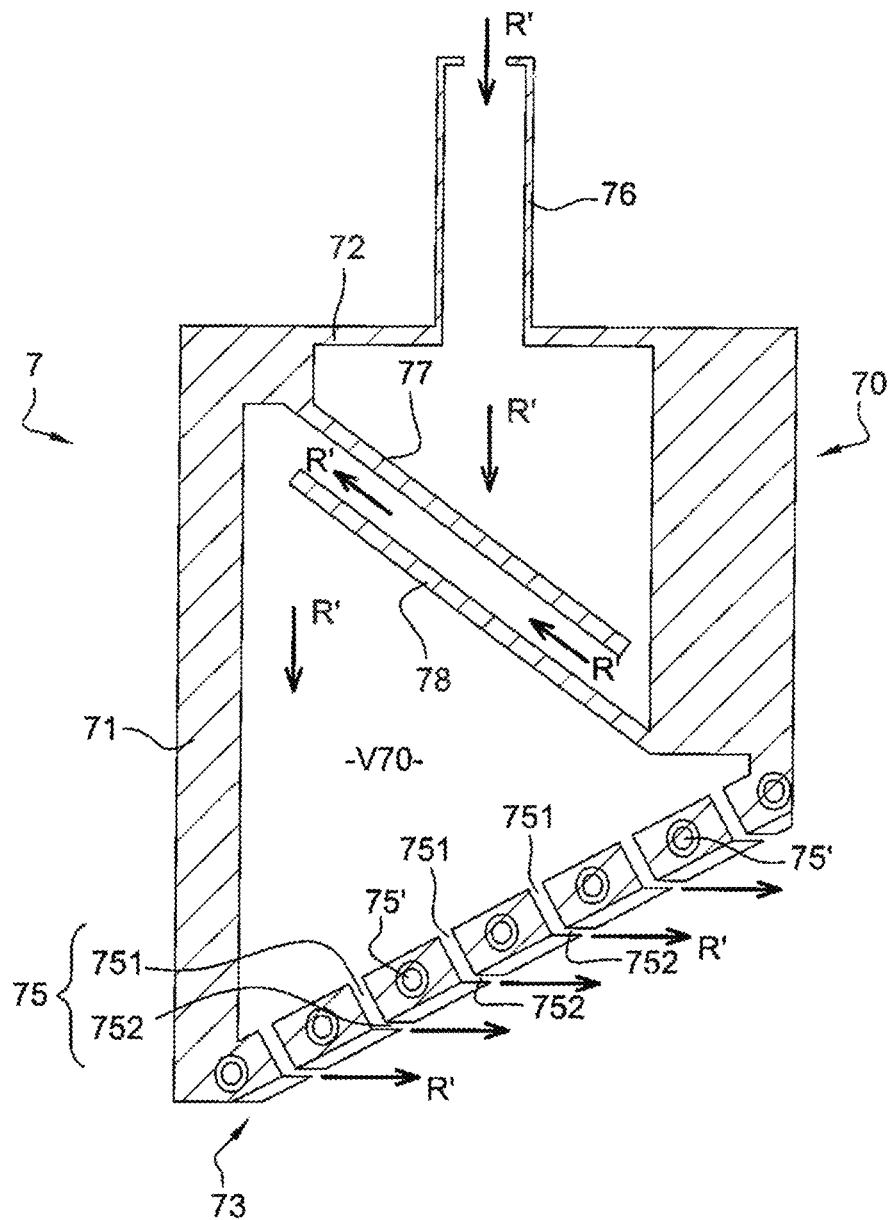
FIG. 6 is a longitudinal cross-section view showing a reactive gas circulation device, belonging to the enclosure of FIG. 2.

In reference now to FIG. 6, the first circulation device 7 includes a body 70 defining an interior volume V70 bordered by peripheral walls 71, an upper wall 72 and a plate forming a bottom wall 73. The latter, which extends obliquely, is equipped with removable means for removable attachment, both to the adjacent module 5 and to the upstream unit 8. As an example, tenons, not shown, provided on the wall 73, may penetrate mortises, also not shown, formed in the opposing walls of the module 5 and the unit 8, respectively.

The oblique plate 73 has regularly distributed circulation orifices, which have been hollowed out. Each orifice 75 has an oblique upper segment 751, extending almost perpendicularly to the plane of the plate 73, as well as a lower segment 752 extending horizontally, namely substantially parallel to the direction of movement of the substrate. The plate 73 is also penetrated by lateral tubes 75', intended for the flow of a heat transfer fluid, in particular water, for cooling the part 73. Advantageously, said fluid is to flow in alternating directions between two adjacent tubes, similarly to the flow of fluid in the orifices 53 described above. According to an alternative not shown, it is possible for a thermocouple to be inserted into the plate 70 so as to control the temperature thereof.

The body 70 is equipped, in its upper portion, with at least one neck defining a gas circulation channel, which opens into the aforementioned interior volume. As an example, it is possible to provide two identical necks, provided one behind the other along the lateral axis YY. Thus, in FIG. 6, one 76 of said necks is shown, with the understanding that the other is located behind what is visible.

As will be seen below, each neck can be selectively connected either to a reactive gas source or to a vacuum source. The device 7 is also equipped with two deflectors 77 and 78, made, for example, in the form of thin sheets. Said deflectors, which are attached to the walls of the body 70 by any suitable means, define a gas path generally in the form of a Z between the intake channel and the injection orifices. This makes it possible to extend said path and, consequently, to increase the residence time of the reactive gases and to homogenize the gases in the volume V70. In FIG. 6, the path of the reactive gases is represented by the different arrows R'.

The structure of the device 7' is preferably identical to that of the device 7, as described above. This is advantageous, in particular in terms of overall simplicity of the design of the facility according to the invention. In the Figures, the mechanical elements of said device 7', which correspond to those of the device 7, are assigned the same reference numbers to which the "prime" suffix is added. In the figures, it is noted that said two devices 7 and 7' are arranged mutually symmetrically, with respect to a transverse median plane of the reaction chamber.

Figure 7:
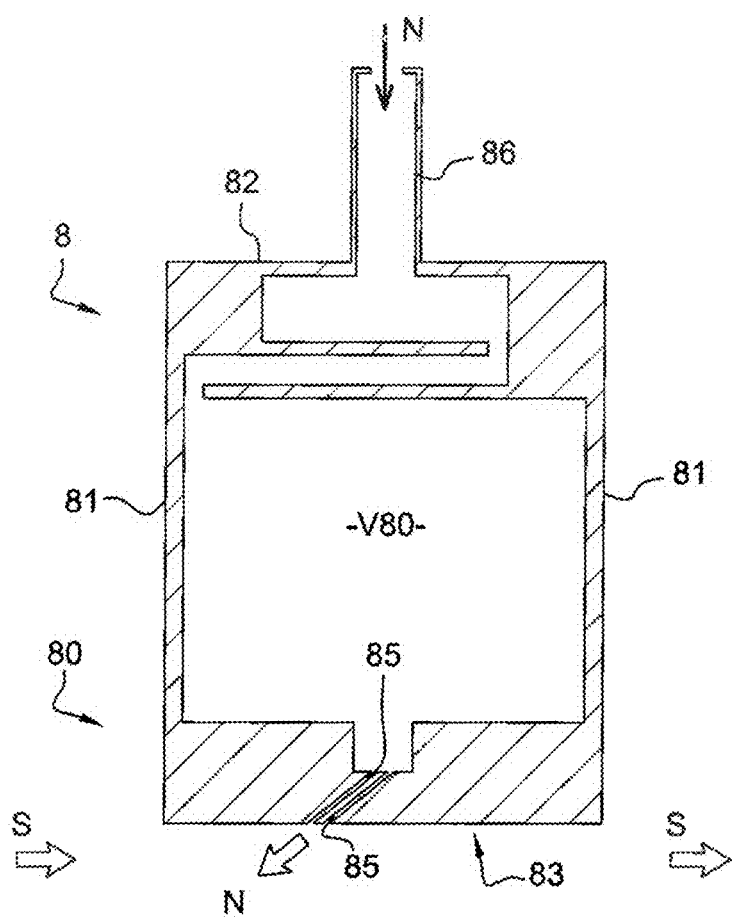
FIG. 7 is a longitudinal cross-section view showing a barrier gas distribution unit, belonging to the enclosure of FIG. 2.

As shown in FIG. 7, the first barrier gas distribution unit 8 includes a body 80 defining an interior volume V80 bordered by peripheral walls 81, an upper wall 82 and a bottom plate 83. The latter is provided with mortises, not shown, capable of cooperating with tenons provided on the adjacent device 7, for the mutual removable attachment of said unit 8 and said device 7.

The plate 83 has distribution slots 85 hollowed out, which are shown from below in FIG. 8. Said slots 85 are distributed along three lines L85, advantageously arranged in a staggered manner. Typically, each slot 85 has a length of between 0.3 cm and 1.0 cm, and a width of between 0.02 cm and 0.5 cm. As shown in FIG. 7, in a side view, the slots are formed in an inclined manner with respect to the vertical, according to an angle A85, for example, between 0° and 60°. In other words, said slots allow for a gas distribution toward the inlet of the reaction chamber 4, namely in a direction opposite that of the movement of the substrate.

The body 80 is finally equipped, in its upper portion, with at least one neck defining a gas inlet channel, which opens into the aforementioned interior volume. As an example, it is possible to provide two identical necks, one behind the other along the lateral axis YY. Thus, in FIG. 7, one 86 of said necks is shown, with the understanding that the other is located behind what is visible. As will be seen below, said neck can be connected to a neutral gas source. In FIG. 7, the path of the neutral gas is represented by the different arrows N.

The structure of the unit 8' is preferably identical to that of the unit 8, as described above. In the figures, the mechanical elements of said unit 8', which correspond to those of the unit 8, are assigned the same reference numbers to which a "prime" suffix is added. In the figures, it is noted that said two units 8 and 8' are arranged mutually symmetrically, with respect to a transverse median plane of the reaction chamber. In particular, in the front view, the barrier gas distribution slots face the exterior of the reaction chamber 4, namely the slots of the upstream unit 8 face upstream, while the slots of the downstream unit 8' face downstream.

Figure 11:
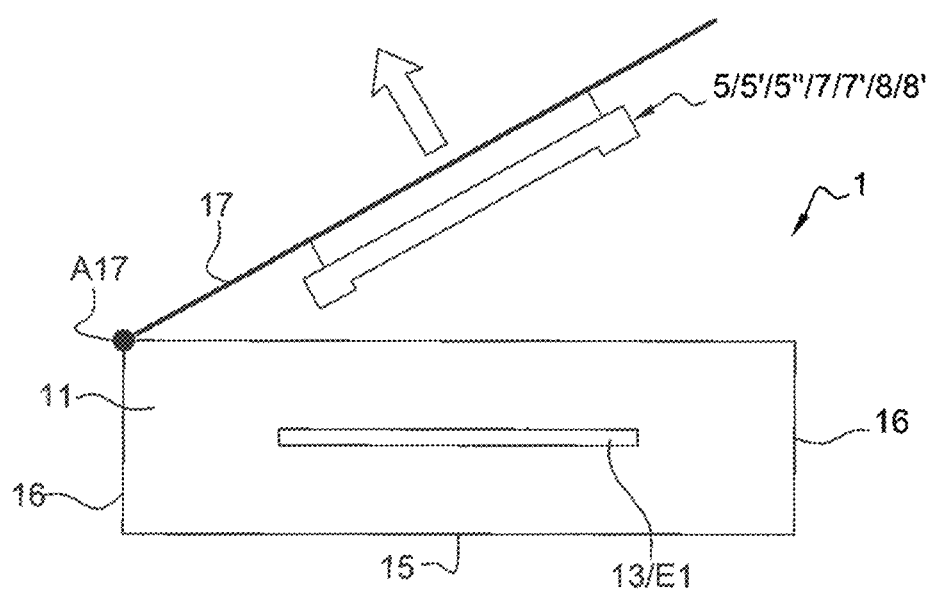
FIG. 11 is an end view, showing a constructive embodiment of the enclosure of FIG. 2.

According to an alternative of the invention, shown in FIG. 11, the main enclosure 1 is produced in the form of a box, having front 11 and rear (not shown) walls, respectively, in which respective slots are formed, of which only 13 is shown. Said slots, which extend only over a portion of the width of the box 1, define the inlet E1 and the outlet S1 of the enclosure, respectively. Said box 1 also includes a bottom 15, side walls 16, as well as an upper wall 17. The latter is made in the form of a pivoting hatch, rotatably mounted on the apex of one of the side walls about an axis A17, parallel to the longitudinal direction of the enclosure, namely the direction of movement of the substrate.

As schematically shown in said figure, the different mechanical members 5, 5', 5", 7, 7', 8 and 8', described above, are attached to the hatch 17. Preferably, said attachment is removable. The embodiment shown in said FIG. 11 has specific advantages. Indeed, an operator is capable of easily raising the hatch in order to access the interior volume of the enclosure 1. Under these conditions, the operator may conveniently perform a cleaning operation, in particular on any carbon deposits that might be present on the aforementioned mechanical members and/or on the interior walls.

In reference now to FIGS. 9 and 10, the suction assembly 9 includes a common transition box 90, into which an admission passage 91, two extraction ducts 92 and a junction passage 93 respectively open. The admission passage 91, or downstream passage, makes it possible to supply the substrate to the box 90. The junction passage 93, or downstream passage, enables the transfer between said box and the inlet E1 of the main enclosure. These two passages have shapes and dimensions adapted to those of the moving substrate. In the example shown, they are therefore rectangular. Advantageously, an intermediate space that is as small as possible is provided between the opposing faces of said substrate and each of said passages.

In the front view, as shown more specifically in FIG. 10, the box 90 has a general diamond shape. In other words, its cross-section decreases continuously, from its junction with each of the passages 91 and 93, to its junction with each of the ducts 92. Each duct 92 has a tubular shape, for example substantially cylindrical, the cross-section of which is, for example, between 15 and 60 millimeters. It is placed in communication with a vacuum source, not shown, of any suitable type.

The structure of the assembly 9' is preferably identical to that of assembly 9, as described above. In the figures, the mechanical elements of said assembly 9', which correspond to those of assembly 8, are assigned the same reference numbers to which the "prime" suffix is added. In the figures, it is noted that said two suction assemblies 9 and 9' are arranged mutually symmetrically, with respect to a transverse plane of the facility.

Figure 17:
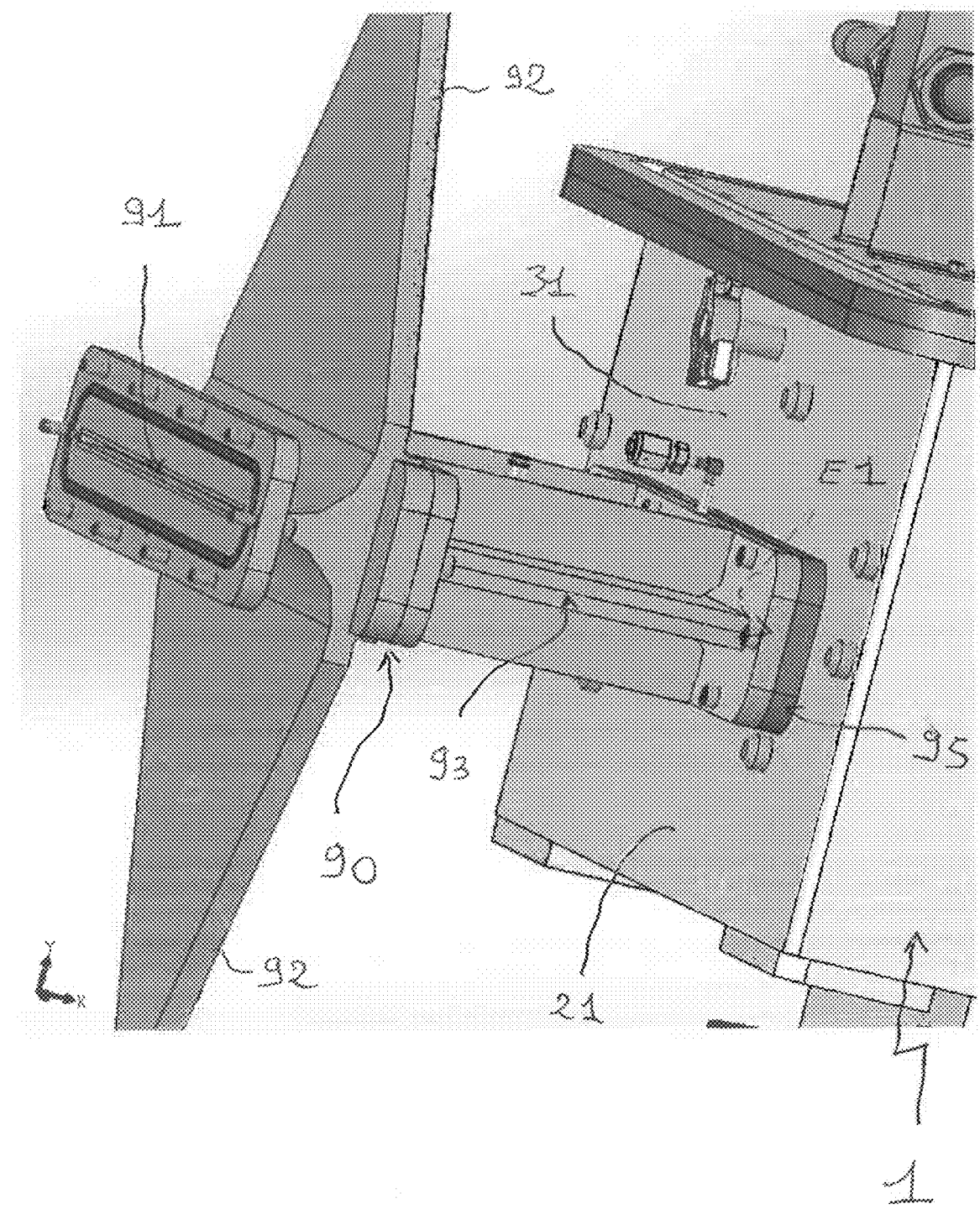
FIG. 17 is a perspective view, more specifically showing the front wall of the reaction chamber of FIG. 3, the suction unit of FIG. 9 as well as a complementary injection member, inserted between said reaction chamber and said suction unit.

According to an advantageous embodiment of the invention, described in reference to FIGS. 17 and 18, it is possible to insert an additional plate 95, forming a complementary injection member. Said plate 95, which is of the blade or air knife type, is provided between the junction passage 93 and the front walls 21 and 31 of the enclosure 1, defining the inlet E1. Said plate 95, with a rectangular shape, has a main slot 96 extending in the extension both of the junction passage 93 and the aforementioned inlet E1 hollowed out.

In addition, different orifices extend into the plate, so as to link the slot 96 with the upper and lower walls, respectively, of the plate 95. In the figure, the upper orifices are denoted 97, in which the outlets 97' opposite the slot are visible, and the lower orifices are denoted 98, in which the outlets 98' adjacent to the slot are visible. The path of said orifices 97 and 98 is represented with dotted lines, in said FIG. 18. Each orifice 97, 97' is placed in communication with a barrier gas source, in particular nitrogen, which is not shown.

The attachment of said plate 95 with respect to both the passage 93 and the reaction chamber 4 is ensured by any suitable means. A removable attachment is preferred, for example a screw-type attachment. In addition, sealing means, not shown in FIGS. 17 and 18, are provided. Said means, of any type known per se, ensure the sealing between the opposing faces, on the one hand of the plate 95 and the passage 93 and on the other hand of the plate 95 and the chamber 4.

In the example, three orifices 97 and 98 are provided, both in the bottom portion and in the top portion of the plate. As an alternative, this number of orifices may be different, with the understanding that it is preferable for the number of lower orifices and the number of upper orifices to be identical. Similarly, it is preferable for the orifices to be provided at equal distances from one another. For example, the plate has a thickness E95 typically in the vicinity of 10 millimeters, the slot has a width 196 typically in the vicinity of 5 millimeters, while each orifice has a diameter d97 typically in the vicinity of 4.5 millimeters.

Figure 12:
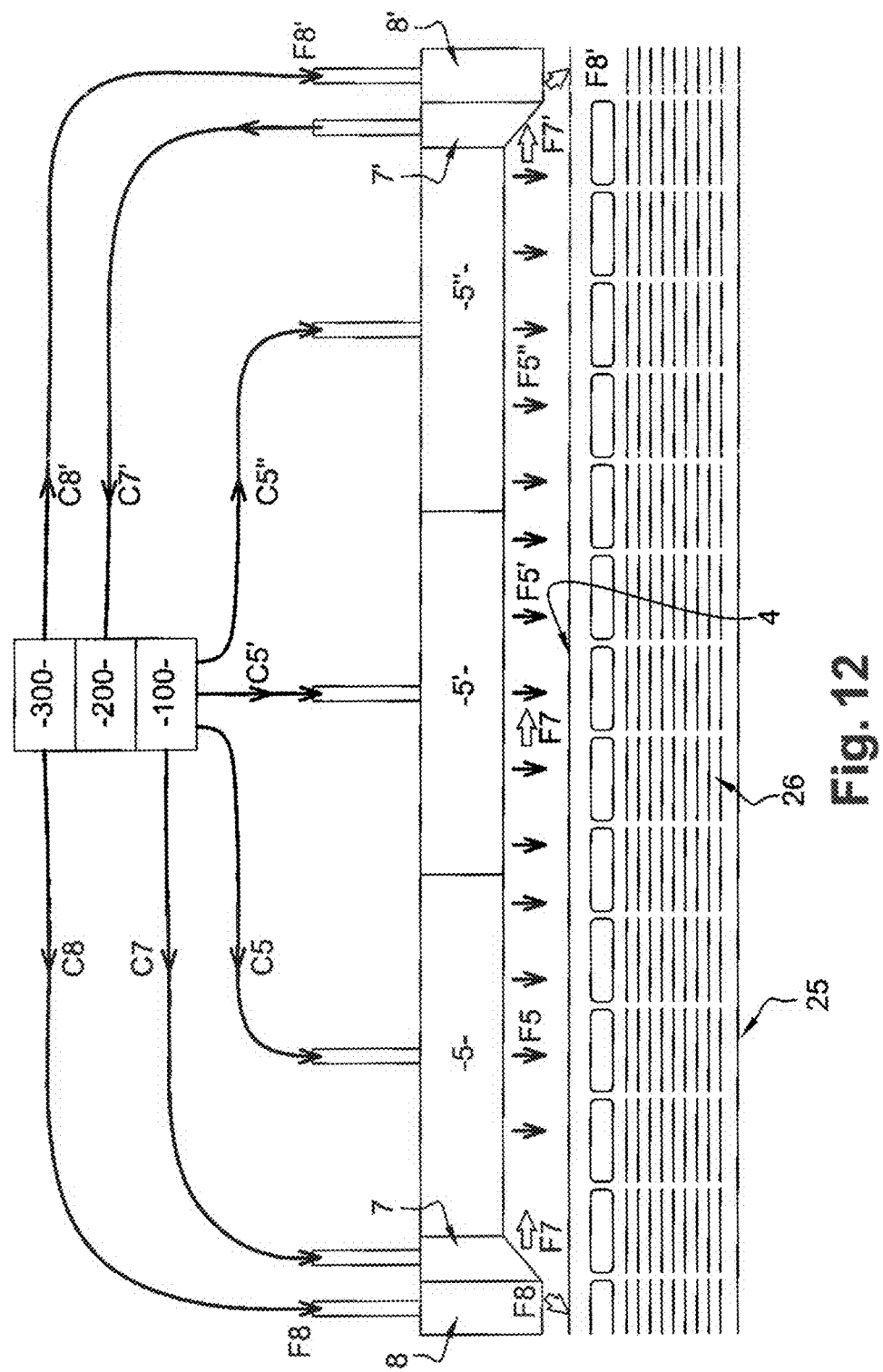
FIGS. 12 to 14 are front views corresponding to FIG. 3, showing three embodiments of the reaction chamber of said FIG. 3.
Figure 13:
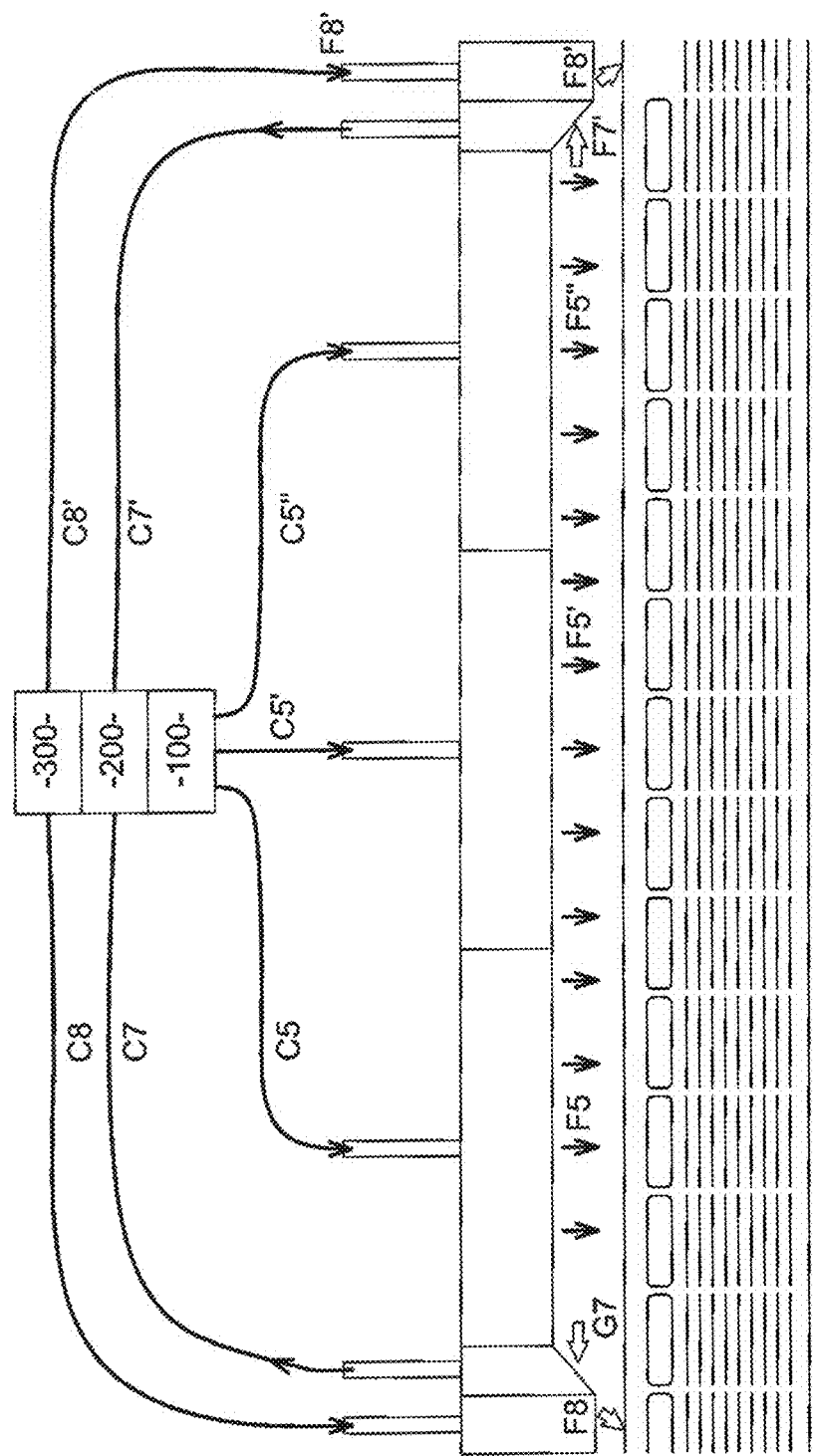
Figure 14:
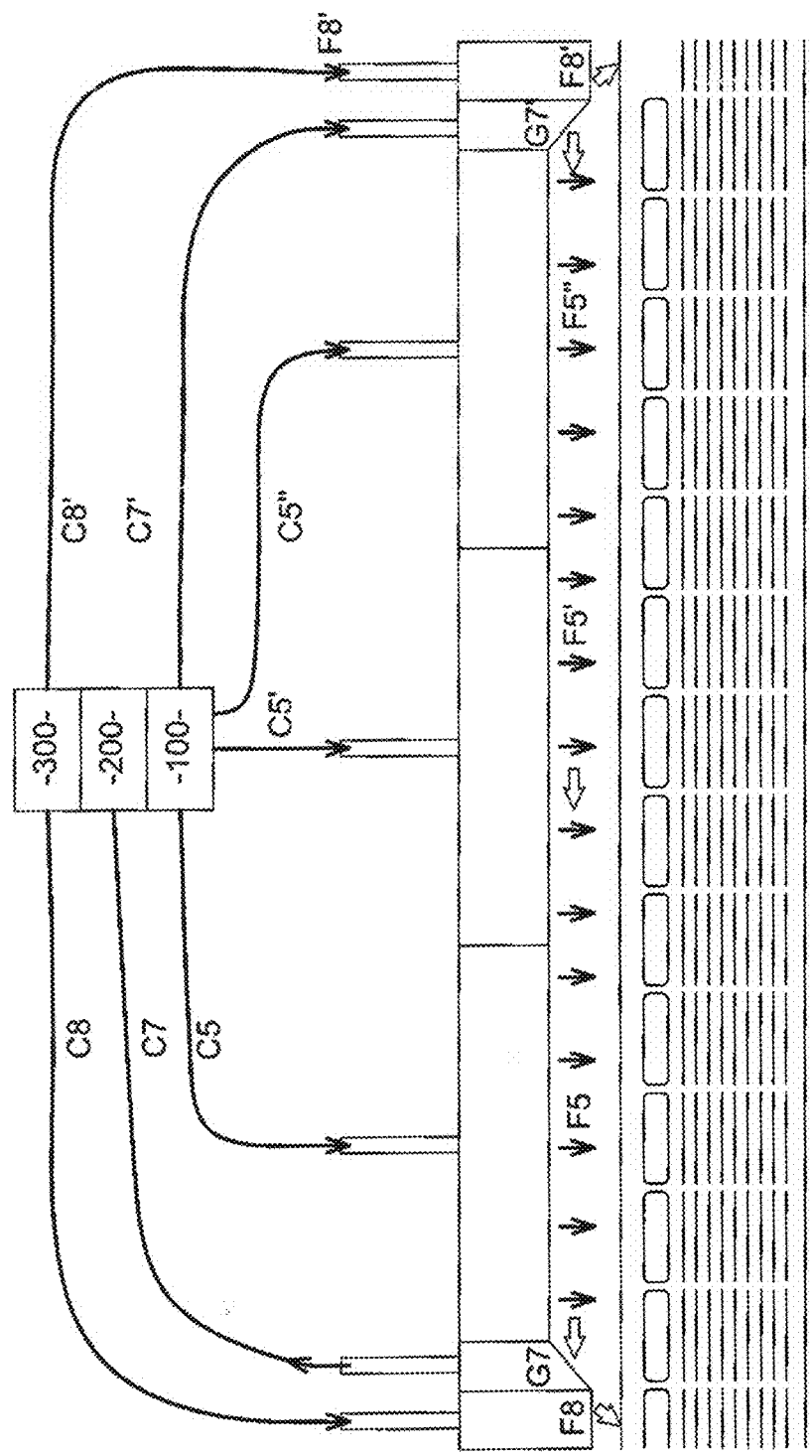

We will now describe, in reference to FIGS. 12, 13 and 14, three embodiments of the facility according to the invention, as described above. In these figures, a reactive gas source 100, a vacuum source 200, a barrier gas source 300, as well as connections C5, C7, C7', C8 and C8' are shown. These connections may be of any suitable type: it is thus possible to provide simple connections and/or multiple connections.

Aspects common to said three embodiments will now be described, namely: the mode of transfer of the substrate to be treated, the inerting of the interior volume of the enclosure 1, the implementation of heating elements, the mode of injection of reactive gases by modules 5 to 5'', as well as the implementation of assemblies 9, 9' and units 8, 8'.

Typically, the movement of the substrate is produced according to a "roll-to-roll" method, which is known per se. The substrate is fed from an upstream coil to a downstream coil, neither of which is shown. The substrate may in particular be a metal sheet or strip, or a carbon cloth. Its thickness may typically be between 15 µm and 200 µm, and its width between 10 mm and 1000 mm or more. The metal constituting the substrate is, for example, pure aluminum or any grade of aluminum, or stainless steel.

According to the main alternative of the invention, the reaction is implemented on a moving substrate. In other words, the substrate is admitted at the inlet of the facility, then moves continuously while being subjected to the desired reaction. In FIGS. 1, 7 and 8, the arrows S represent the movement of said substrate. As a subsidiary alternative, it is possible for the substrate to be admitted at the inlet of the facility, then to stop at a precise location. Once it is immobile, it is subjected to the reaction, then, once said reaction has been completed, the substrate is again moved so as to exit through the outlet of the facility.

As shown in particular in FIG. 9, when the substrate progresses through the admission passage 91, it drives with it on its two faces an ambient air stream, represented in FIG. 9 by the arrow AIR. This ambient air stream opposes a barrier gas stream, which prevents a significant amount of said ambient air from entering, in the direction of the main enclosure 1. Said barrier gas is formed by the mixture between the neutral gas N, injected by unit 8, and an inerting gas.

In reference to FIG. 2, a first inerting gas fraction is injected into the lower portion 2, according to arrows I1. This gas makes it possible to flush the air from said lower portion to the upper portion. The passage of said inerting gas and said air is allowed by the presence of gaps at the interface between said two portions.

In addition, a second inerting gas fraction is injected into the main chamber, according to arrows I2. This injection is preferably implemented both upstream and downstream of said main chamber. The inerting gas, injected both according to I1 and I2, is mixed with the neutral gas N injected through the slots 85 of each unit 8 (see FIG. 7). Said mixture forms a barrier gas, the stream of which is represented by arrow B in FIG. 9.

The vacuum sources are also activated so that said barrier gas B blocks the ambient air at the level of the transition box. Said air and said barrier gas are discharged through ducts 92 according to arrows F92, shown in FIGS. 9 and 10. The barrier gas stream also makes it possible to prevent the reaction gases from leaving the enclosure through passage 91; indeed, the barrier gas stream is advantageously discharged through ducts 92 to a gas treatment center (not shown in the figures).

As an additional precaution, it is possible for an additional barrier gas fraction to be injected through orifices 97 and 98 of the plate 95. Said injection may be continuous or occasional. It makes it possible to produce a curtain or knife of barrier gas, which is useful in particular in the event of a failure of the transition boxes 90 and/or an ill-timed admission of oxygen into the reaction chamber. The use of said complementary injection plate 95 also makes it possible to reduce the amount of oxygen in the main chamber.

After it has been subjected to the barrier gas stream in the passage 93, the substrate proceeds into the preheating zone, where it is first pressed against the soleplate 10, by means of the tensioning roller 38. Then, said substrate is brought to a temperature suitable for the desired treatment. As an example, in the case of an aluminum substrate, it is preferable for said temperature to be below the melting point of metal, i.e. around 650° C. Given that the substrate is kept under tension and has an extension that increases with temperature, it is preferable very specifically to subject it to a temperature well below said melting temperature, i.e. preferably a temperature that does not exceed 620° C. to 630° C.

In the present embodiment, the heating is achieved by mechanical contact, rubbing the substrate on the soleplate 10, itself heated from its lower surface by the heating elements. Said fixed soleplate, which defines the reaction chamber 4 as explained above, is advantageous in that it prevents the deposition of nanotubes on the heating elements. In other embodiments, not shown in the figures, it is possible to envisage a deposition on the two opposite faces of the substrate. In this case, radiant heating is preferred. Indeed, as the nanotubes are black, they absorb infrared radiation.

Said substrate is then subjected to the actual treatment, in the reaction chamber. The reactive gases include a "carbon source" gas and a catalyst. The catalyst may advantageously be ferrocene. The "carbon source" gas may be C2H2. The injection of reactive gases is performed as follows. As the preferred catalyst is a relatively insoluble solid, a sufficient catalyst concentration for evaporation in the "carbon source" carrier gas before introduction would not be obtained in solution. It is therefore injected as an aerosol, and it is assumed that before arriving in contact with the substrate, said droplets evaporated completely. The gas phase in contact with the substrate is therefore homogeneous. An alternative technique would be the preliminary deposition of the catalyst onto the surface in a separate method step; in this case, the "carbon source" gas could in fact be introduced in a form other than aerosol (namely in the homogeneous gas phase). However, the method by aerosol is preferred to the method with the preliminary deposition of the catalyst, because it makes it possible to produce vertically aligned nanotubes of higher quality and greater height.

The injection of reactive gases, by modules 5 to 5", is represented by the respective arrows F5 to F5", shown in FIGS. 12 to 14. This injection is performed vertically, namely perpendicularly to the direction of movement of the substrate. As will be explained below, this main injection may be complemented by a secondary injection, performed by means of device 7 and/or device 7'.

To prevent the ambient air from entering through the outlet S1 of the enclosure, in the direction of the reaction chamber, the downstream assembly 9' and the downstream unit 8' mutually cooperate, in a manner identical to that described above for the upstream assembly 9 and the upstream unit 8. The barrier gas injection is represented by arrow F8' in FIGS. 12 to 14.

In the first embodiment, shown in reference to FIG. 12, the upstream device 7 is used in "injection" mode. Under these conditions, its neck 76 is connected to the reactive gas mixture source 100. The latter therefore flows, in use, from said source to the volume V70, before being injected into the chamber via the orifices 75. Said mixture is therefore transported, in said chamber 4, in a direction parallel to that of the movement of the substrate, and in the same direction. This gas mixture transport is represented by arrow F7 in FIG. 12.

However, the downstream device 7' is used in "suction" or "extraction" mode. Under these conditions, its neck 76' is connected to the vacuum source 200. The gas mixture is therefore suctioned, in use, from the chamber 4 to the volume V70', via the orifices. Said gas mixture extraction is represented by arrow F7' in FIG. 12.

In the second embodiment, shown in reference to FIG. 13, the devices 7 and 7' are both used in "suction" or "extraction" mode. Under these conditions, they are both connected to the source 200. This double gas mixture extraction is represented by the respective arrows G7 and F7' in FIG. 13. A portion of the mixture is therefore transported in a direction parallel to that of the movement of the substrate, and in the same direction, while another portion of said mixture is transported in a direction parallel to that of the movement of the substrate but in the opposite direction. The reactive gas injection is therefore performed only from modules 5 to 5".

In the third embodiment, shown in reference to FIG. 14, the upstream device 7 is used in "extraction" mode, so that it is connected to the source 200. However, the downstream device 7' is used in "injection" mode, so that it is connected to the source 100. The gas mixture is therefore transported, in the chamber 4, in a direction parallel to that of the movement of the substrate, but in the opposite direction. These operations are represented by the respective arrows G7 and G7' in FIG. 14.

In any of the three embodiments described above, the gas flow rate and/or the reactant concentration may be different from one another for the modules 5, 5', 5" and, according to the circumstances, for the device 7 or 7'. As an alternative, for at least two of said mechanical injection members, the gas flow rate and or the reactant concentration may be different. In the VACNT synthesis, the reactant concentration decreases along the reaction chamber, which tends to modify the growth of said VACNT. The adjustment of the flow rate and/or the concentration in the two modules 5' and 5" makes it possible in particular to keep a concentration substantially constant long the chamber.

As explained above, the facility according to the invention is highly modular. This is due in particular to the fact that the devices 7 and 7' may perform an injection or an extraction function, thereby allowing for different implementations of said facility. A person skilled in the art will choose either of said implementations in order to obtain optimal growth, in particular according to the following parameters: nature and dimensions of the substrate; nature of the reactive gas; and operating conditions.

In this regard, it is noted that, in US 2011/3182560, the gas extraction ducts provided on either side of the synthesis zone cannot adopt an additional functional configuration. In addition, if it is assumed that said ducts are implemented in an injection configuration, said second injection direction would be parallel to the first direction of injection by the tubes provided opposite the synthesis chamber. In other words, said extraction ducts are not suitable for injecting the active mixture in a second direction, different from said first direction.

FIG. 19 shows an advantageous alternative of the invention, concerning the transition box 90 shown in FIGS. 9 and 10. According to said alternative, two plates 94 forming deflectors extend in the direction DS of movement of the substrate, on either side of the latter. Said deflectors 94 are placed opposite outlets of the two extraction ducts 92, while projecting longitudinally both into the admission passage 91 and the junction passage 93. In the transverse view, said deflectors advantageously extend over a substantial portion of the aforementioned box 90.

FIG. 20 shows an advantageous alternative of the invention, analogous to that shown in FIG. 19, concerning the complementary injection plate 95 shown in FIGS. 17 and 18. According to this alternative, two plates 99 forming deflectors, analogous to those 94 of FIG. 19, extend in the direction of movement of the substrate, on either side of the latter. Said deflectors 99 are placed, inside the slot 96, opposite outlets of the orifices 97 and 98. In the transverse view, said deflectors advantageously extend over a substantial portion of the aforementioned box 90.

The respective deflectors 94 and 99, described above in reference to FIGS. 19 and 20, have specific advantages. Indeed, the applicant has noted that the use of said deflectors makes it possible to reduce the mechanical disturbance to which the moving substrate is subjected. Indeed, the gas streams respectively discharged by the ducts 92 or admitted through the orifices 97 and 98 flow substantially parallel to the direction of movement of the substrate. However, in the absence of such deflectors, the aforementioned streams are respectively discharged or admitted perpendicularly to said direction of movement. In the latter case, there is a tendency to observe instability of the substrate, the appearance of vibrations to which the latter is subjected, as well as an unstable equilibrium of forces exerted on said substrate.

Said deflectors 94 and 99 are also advantageous in that they ensure increased safety of the facility. Indeed, owing to the use of said deflectors, the dynamic of the fluids is only slightly if at all modified by the presence or absence of the substrate. Thus, the air does not substantially enter, even in the absence of the substrate, which would be due in particular to an accidental rupture thereof. Such an accidental situation would therefore nevertheless be stable and non-disturbing for the substrate. The overall efficacy is therefore independent of the presence of the substrate.

With a facility according to the invention as described above, with three reactive gas injection modules 5, 5', 5" and base plate 50 dimensions of around 300 mm×300 mm, operating with a mixture of toluene/ferrocene (in which the ferrocene is the catalyst and the toluene is its carrier gas) and C2H2 as the "carbon source" gas at a pressure of between 0.9 bar and 1.1 bar and a temperature of the aluminum substrate of approximately 580° C. to 615° C., a growth rate of the vertically aligned carbon nanotubes of between around 1 µm/min and around 15 µm/min may be expected. If the substrate is moving, in the direction described above, its rate of movement is typically between 0.1 m/h and 10 m/h.

Examples

The invention is illustrated below by examples that do not, however, limit the scope.

The growth of carbon nanotubes (hereinafter referred to as CNT) occurs in the presence of a catalyst source and a carbon source. In the facility according to the invention, the catalytic source in particular of ferrocene is dissolved in a toluene solution at different percentages. The ferrocene is decomposed at a temperature of 826° C., which makes it possible to have CNT growth at 850° C. However, for growth at a lower temperature, the ferrocene does not decompose, and it is therefore necessary to use hydrogen to lower the decomposition temperature of ferrocene to between 400° C. and 450° C. In addition, at the growth temperatures on aluminum, toluene decomposes very little and therefore is not a carbon source favorable for CNT growth. It is necessary to introduce a carbon source the decomposes at a lower temperature, and it is possible to use acetylene.

In the following two examples, we present a synthesis performed on an aluminum alloy substrate. Synthesis No. 1 is performed statically for a synthesis time of 60 min. A carbon nanotube mat of around 120 micrometers (µm) is obtained. Synthesis No. 2, which is performed in roll-to-roll mode, makes it possible to obtain a height of 20 µm. In this case, the residence time of the substrate in the reaction chamber was shorter due to the movement of the substrate.

An analysis with transmission electron microscope of CNTs obtained in both types of synthesis makes it possible to estimate the average external diameter at between 8 and 9 nanometers (nm).

TABLE 1

Parameters of VACNT synthesis on aluminum substrate

| | | Synthesis No. 1 | Synthesis No. 2 |
|---|---|---|---|
| Type of aluminum | | Aluminum 3003 with 1% manganese and a thickness of 40 µm | |
| Rate of movement of the film (m/h) | | 0 | 1 |
| Soleplate temperature (° C.) | | 580 | 580 |
| Concentration of the toluene/ferrocene mixture | | 10% by weight ferrocene | |
| Injection module 5 | Argon flow rate (L/min) | 1.200 | 1.200 |
| | Hydrogen flow rate (L/min) | 0.900 | 0.900 |
| | Acetylene flow rate (L/min) | 0.900 | 0.900 |
| | Injected liquid mass (g/h) | 48 | 48 |
| Injection module 5' | Argon flow rate (L/min) | 0.250 | 0.250 |
| | Hydrogen flow rate (L/min) | 0.188 | 0.188 |
| | Acetylene flow rate (L/min) | 0.188 | 0.188 |
| | Injected liquid mass (g/h) | 10 | 10 |
| Injection module 5" | Argon flow rate (L/min) | 0.250 | 0.250 |
| | Hydrogen flow rate (L/min) | 0.188 | 0.188 |
| | Acetylene flow rate (L/min) | 0.188 | 0.188 |
| | Injected liquid mass (g/h) | 10 | 10 |
| Total injected liquid mass (g) | | 78 | |
| Curtain gas 1 and 2 (L/min) | | 40 | |
| Inerting gas (L/min) | | 200 | |
| Relative pressure in the main enclosure (mbar) | | −0.51 | −0.50 |
| Relative pressure in the reaction chamber (mbar) | | −0.57 | −0.53 |
| Oxygen content in the main enclosure (ppm) | | 300 | 400 |
| Oxygen content in the reaction chamber (ppm) | | 11 | 10 |

FIGS. 21 and 22, appended, show at low and high magnifications, respectively, an example of VACNT (vertically aligned carbon nanotube) growth on the aluminum alloy AlMn1 above, for synthesis condition 1 as described above.

Figure 23:
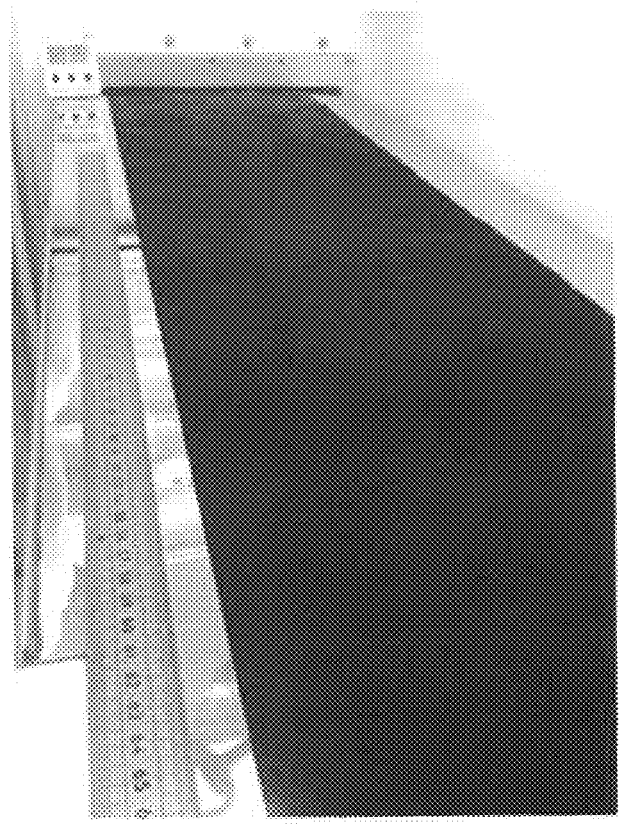
FIGS. 23 and 24 are photographs showing a second synthesis according to the invention, of carbon nanotubes on an aluminum substrate in roll-to-roll mode at the outlet of the synthesis facility and of vertically aligned carbon nanotubes on an aluminum substrate wound on an exit roll, respectively.
Figure 24:
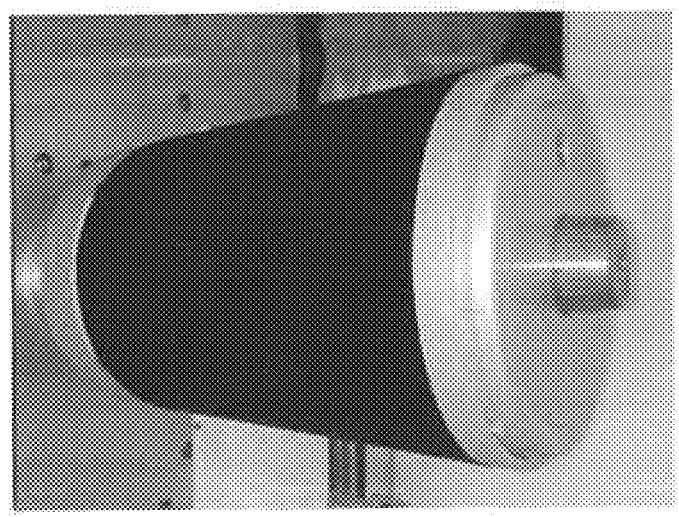
Figure 25:
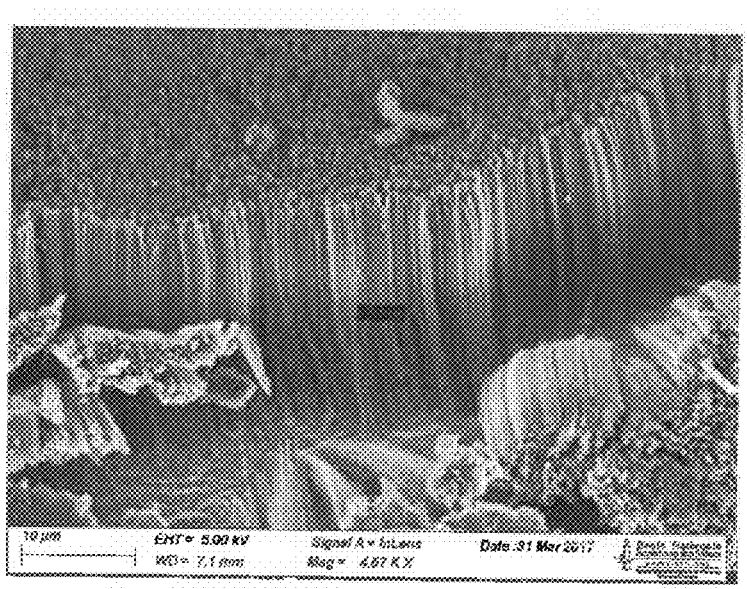
FIGS. 25 and 26 are photographs, corresponding to FIGS. 21 and 22, showing, at two different magnifications, a sample obtained by the second synthesis according to the invention.
Figure 26:
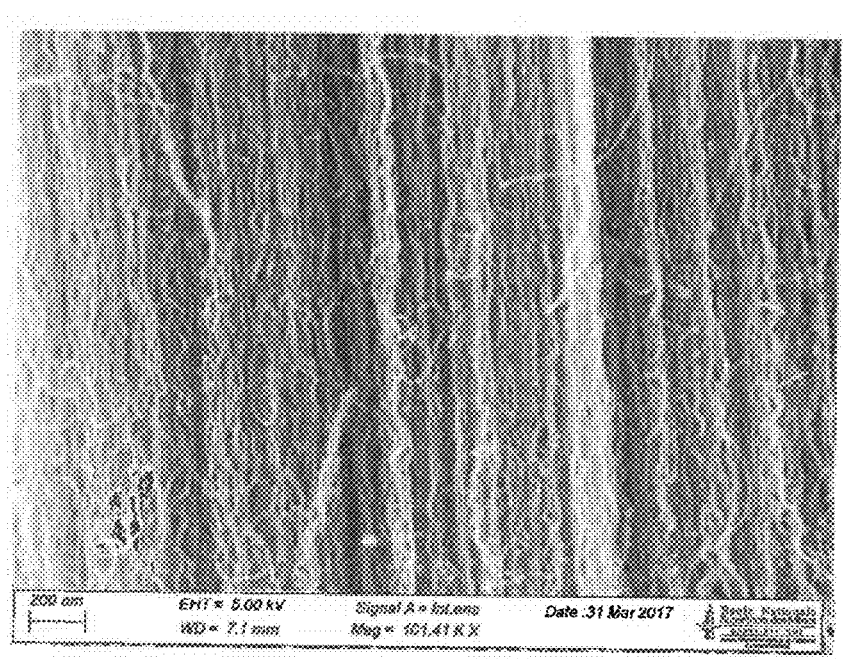

FIGS. 23 to 26, appended, show different aspects of synthesis 2, as described above. FIG. 23 first shows carbon nanotubes on an aluminum substrate, in roll-to-roll mode, at the outlet of the facility where said synthesis has taken place. In addition, FIG. 24 shows this same aluminum substrate and the VACNTs wound on an exit roll. FIGS. 25 and 26, appended, analogous to FIGS. 21 and 22 mentioned above, show at low and high magnifications, respectively, images of said synthesis 2 on said aluminum alloy AlMn1 with said VACNTs.

LIST OF REFERENCE SYMBOLS

The following numeric references are used in the present description:
XX Longitudinal axis
YY Lateral axis
ZZ Vertical axis
1 Main enclosure
2 Lower zone of Main enclosure
3 Upper zone of Main enclosure 4 Reaction chamber
5 Reaction gas injection module
5' Reaction gas injection module
5" Reaction gas injection module
7 Circulation device
7' Circulation device
8 Barrier gas distribution unit
8' Barrier gas distribution unit
9 Suction assembly
9' Suction assembly
10 Sole plate
11 Front wall
15 Bottom
16 Side walls
17 Upper wall
21 Front wall of Lower zone (of Main enclosure)
22 Rear wall of Lower zone (of Main enclosure)
25 Bottom wall of Lower zone (of Main enclosure)
26 Heating module
26' Heating element
26" Insulating plates
31 Front wall of Upper zone (of Main enclosure)
32 Rear wall of Upper zone (of Main enclosure)
35 Top wall
36 Plates
37 Preheating region
38 Tensioning roller
50 Base plate
52 Orifice
53 Transverse orifice
53' End-piece
53" End-piece
60 Hollow bodies
61 Neck of Hollow bodies
61' Intake channel
62 Passages
63 Diffusion members
64 Tube of Diffusion members
64' Orifices of Tube (of Diffusion members)
65 Diffusion elements
66 Main enclosure
70 Body of Circulation device
71 Peripheral walls
72 Upper wall
73 Bottom wall
75 Orifices
75' Lateral tubes
76 Necks
77 Deflector
78 Deflector
80 Body of Barrier gas distribution unit
81 Peripheral walls
82 Upper wall
83 Bottom wall
85 Slots
86 Necks
90 Transition box
91 Admission passage
92 Extraction ducts
93 Junction passage
94 Deflectors
95 Injection plate
96 Slot of Injection plate
97 Orifice
98 Orifice
97' Outlet of Orifice
98' Outlet of Orifice
99 Deflectors
100 Reactive gas source
200 Vacuum source
300 Barrier gas source
751 Segment of Orifices
752 Segment of Orifices
AIR Air path
B Barrier gas path
C5 Connection
C7 Connection
C8 Connection
E1 Inlet of Main enclosure
F Gas path
G Gas path
H1 Height of Main enclosure
H2 Height of Lower zone (of Main enclosure)
I1 Width of Main enclosure
I1 Inerting gas
I2 Inerting gas
L1 Length of Main enclosure
L5 Length of Reaction gas injection module
L85 Lines of Slots
N Neutral gas path
R Reactive gas path
R' Reactive gas path
S1 Outlet of Main enclosure
V70 Interior volume of Body (of Circulation device)
V80 Interior volume of Body (of Barrier gas distribution unit)
W5 Width of Reaction gas injection module

What is claimed is:

1. A facility for producing a composite material comprising carbon nanotubes, the facility comprising:
at least one a reaction chamber having an injection device to inject an active gas mixture, for the growth of the carbon nanotubes, into an interior volume of the at least one a reaction chamber, the injection device is to transport the active gas mixture in a first direction into the interior volume;
a transport device to transport a substrate, which is to form the composite material, into the reaction chamber; and
a circulation system to circulate the active gas mixture, and which is to transport the active gas mixture into the interior volume in a second direction that is different from the first direction, the circulation system being configured to adopt a first configuration of injection of the active gas mixture into the interior volume of the chamber, and a second configuration of extraction of the active gas mixture from the interior volume.

2. The facility of claim 1, wherein said first direction is substantially perpendicular to a direction of movement of the substrate into the chamber.

3. The facility of claim 2, wherein said second direction is substantially parallel to the direction of movement of the substrate.

4. The facility of claim 1, wherein the circulation system comprises at least two circulation devices arranged respectively on either side of the injection device and upstream and downstream with respect to a direction of movement of the substrate.

5. The facility of claim 4, wherein each circulation device in the at least two circulation devices includes connection members for selective connection to either a gas mixture source or a vacuum source.

6. The facility of claim 1, wherein the injection device comprises:
   at least one injection module that includes a perforated plate for distribution of a gas mixture; and
   a cover defining a volume for homogenization of said active gas mixture.

7. The facility of claim 6, wherein the at least one injection module includes a distribution member, having an inverted semi-oval cross-section, to distribute the active gas mixture in the interior volume of the at least one injection module.

8. The facility of claim 1, further comprising at least two gas supply units to supply a barrier gas to the at least one reaction chamber, each gas supply unit in the at least two gas supply units provided on either side of the injection device with respect to a direction of movement of the substrate.

9. The facility of claim 1, further comprising an enclosure to house at least one of the injection device, the circulation system, and at least two gas supply units to supply a barrier gas to the at least one reaction chamber.

10. The facility of claim 9, wherein the enclosure includes a heating module.

11. The facility of claim 1, further comprising at least two gas suction assemblies provided on either side of the injection means with respect to a direction of movement of the substrate.

12. The facility of claim 11, wherein said at least two gas suction assemblies comprises:
   a pair of extraction ducts in which gas is to flow transversely with respect to the direction of movement of the substrate; and
   a pair of deflectors extending substantially parallel to the direction of movement of the substrate, each deflector in the pair of deflectors having at least a portion thereof being arranged opposite of an outlet of a corresponding one of the extraction ducts.

13. The facility of claim 12, further comprising a complementary gas injection member arranged between an inlet of the at least one reaction chamber and one gas suction assembly in the at least two gas suction assemblies that is located upstream.

14. The facility of claim 13, wherein said complementary gas injection member comprises:
   two series of injection orifices in which gas is to flow transversely with respect to the direction of movement of the substrate; and
   a pair of complementary gas injection member deflectors, extending substantially parallel to the direction of movement of the substrate, a portion thereof being arranged opposite of an outlet of a corresponding one of the series of injection orifices.

15. A method, comprising:
   providing a facility for producing a composite material comprising carbon nanotubes, the facility including:
      at least one a reaction chamber having an injection device to inject an active gas mixture, for the growth of the carbon nanotubes, into an interior volume of the at least one a reaction chamber, the injection device is to transport the active gas mixture in a first direction into the interior volume;
      a transport device to transport a substrate, which is to form the composite material, into the reaction chamber; and
      a circulation system to circulate the active gas mixture, and which is to transport the active gas mixture into the interior volume in a second direction that is different from the first direction, the circulation system being configured to adopt a first configuration of injection of the active gas mixture into the interior volume of the chamber, and a second configuration of extraction of the active gas mixture from the interior volume,
   activating the injection device to admit the active gas mixture into the interior volume of the at least one a reaction chamber in the first direction;
   activating the circulation system to transport said active gas mixture along said at least one a reaction chamber, in the second direction; and
   moving the substrate into said at least one a reaction chamber to form carbon nanotubes at a surface of said substrate.

16. The method of claim 15, wherein:
   the circulation system is to transport the active gas mixture in a direction parallel to a direction of movement of the substrate,
   activating the injection device includes admitting a first fraction of the active gas mixture via the injection device, and
   activating the circulation system includes admitting a second fraction of the active gas mixture via the circulation system.

17. The method of claim 16, wherein the second fraction of the active gas mixture is admitted upstream of the reaction chamber, so that the active gas mixture is transported in a same direction as the direction of movement of the substrate.

18. The method of claim 16, wherein the second fraction of the active gas mixture is admitted downstream of the reaction chamber, so that the active gas mixture is transported in an opposite direction of the direction of movement of the substrate.

19. The method of claim 16, wherein activating the circulation system includes activating circulation devices arranged upstream and downstream with respect to a direction of movement of the substrate so that a portion of the active gas mixture is transported in a same direction as the direction of movement of the substrate, while another portion of the active gas mixture is transported in a direction opposite to the direction of movement of the substrate.

20. A method, comprising:
   providing a facility for producing a composite material comprising carbon nanotubes, the facility including:
      at least one a reaction chamber having an injection device to inject an active gas mixture, for the growth of the carbon nanotubes, into an interior volume of the at least one a reaction chamber, the injection device is to transport the active gas mixture in a first direction into the interior volume;
      a transport device to transport a substrate, which is to form the composite material, into the reaction chamber;
      a circulation system to circulate the active gas mixture, and which is to transport the active gas mixture into the interior volume in a second direction that is different from the first direction, the circulation system being configured to adopt a first configuration of injection of the active gas mixture into the interior volume of the chamber, and a second configuration of extraction of the active gas mixture from the interior volume;
      at least two gas supply units to supply a barrier gas to the at least one reaction chamber; and
      an enclosure having a first region to house at least one of the injection device, the circulation system, and the at least two gas supply units, placing the at least one reaction chamber under reduced pressure with respect to a second region of the enclosure that does not house at least one of the injection device, the circulation system, and the at least two gas supply units, wherein a difference in pressure between the second region of the enclosure and the the reaction chamber is around 5 Pa.

* * * * *